United States Patent
Iwanaga et al.

[11] Patent Number: 6,033,742
[45] Date of Patent: Mar. 7, 2000

[54] LIQUID CRYSTAL DISPLAY DEVICE

[75] Inventors: Hiroki Iwanaga, Yokohama; Katsuyuki Naito, Tokyo, both of Japan

[73] Assignee: Kabushiki Kaisha Toshiba, Kawasaki, Japan

[21] Appl. No.: 09/049,950

[22] Filed: Mar. 30, 1998

[30] Foreign Application Priority Data

Mar. 31, 1997 [JP] Japan ................................ 9-081707
Jul. 31, 1997 [JP] Japan ................................ 9-220210

[51] Int. Cl.$^7$ ........................ C09K 19/60; G02F 1/1333; C09B 1/58
[52] U.S. Cl. ........................ 428/1; 252/299.1; 349/165; 345/88; 552/225; 552/226; 552/234; 552/235
[58] Field of Search ........................ 252/299.5, 299.62, 252/299.01, 299.1; 349/86, 165; 428/1; 345/88; 552/225, 226, 234, 235

[56] References Cited

FOREIGN PATENT DOCUMENTS 74523   3/1983   European Pat. Off. .
2-43791 10/1990   Japan .

OTHER PUBLICATIONS

CAPLUS 1983: 489624, 1983.
F.C. Saunders et al., "New Photostable Anthraquinone Dyes With High Order Parameters", IEEE Transactions on Electron Devices, vol. ED–30, No. 5, May 1993, pp. 499–503.
Shuji Imazeki, "Order Parameters of α–Substituted Anthraquinone Dyes in a Nematic Liquid Crystalline Host", Mol. Liq. Cryst., vol. 140, 1986, pp. 119–131.

*Primary Examiner*—Shean C. Wu
*Attorney, Agent, or Firm*—Finnegan, Henderson, Farabow, Garrett & Dunner, L.L.P.

[57] ABSTRACT

A liquid crystal display device comprises, a pair of substrates having an electrode on a surface thereof,และ a liquid crystal layer containing a liquid crystal and a dichroic dye, wherein the dichroic dye is an anthraquinone dye exhibiting 0.08 or less of Y value represented by the following equation, $$Y = \{\Sigma \Delta H\ tr,m/268 - \Sigma \Delta S\ tr,m\}(kJK^{-1}kg^{-1})$$

wherein $\Sigma \Delta H\ tr,m$ is a sum of an enthalpy change of transition from $-5°$ C. to the melting point of and an enthalpy change of melting per unit weight, and $\Sigma \Delta S\ tr,m$ is a sum of an entropy change of transition from $-5°$ C. to the melting point and an entropy change of melting per unit weight.

31 Claims, 5 Drawing Sheets

( 0 : HOMEOTROPIC ALIGNMENT  
  ✳ : RANDOM ALIGNMENT )

LIQUID CRYSTAL DISPLAY DEVICE

BACKGROUND OF THE INVENTION

This invention relates to a liquid crystal display device using a dichroic dye.

As a display for information processing equipment such as a personal computer, a liquid crystal display device (LCD) of TN (twisted nematic) mode or STN (super twisted nematic) mode is extensively utilized at present.

In TN or STN-LCD, the alignment of liquid crystal molecules in the liquid crystal cell is kept twisted in the initial state. Light entering into the liquid crystal cell emerges from the cell accompanying with a change in the polarized state that has been induced by the twisted alignment and birefringence of the liquid crystal molecules. On the other hand, when an electric field is applied to the liquid crystal cell, the liquid crystal molecules are realigned in the direction of electric field so that the twisted structure thereof is released and the birefringence is no more generated, and hence the incident light emerges from the cell without any change in polarized state. Therefore, when a liquid crystal cell is sandwiched by a pair of linear polarizers, the change in optical characteristics of liquid crystal layer due to the application of electric field can be observed as a change in intensity of light.

The LCD is advantageous over the CRT (cathode ray tube) display because of its low power consumption. However, since the polarizers are employed in the TN- or STN-LCD, the utilization efficiency of incident light on the LCD is substantially low. Therefore, in order to ensure a sufficient brightness, most of the LCD is provided with a backlight. In particular, in an LCD provided with a color filter, a relatively strong backlight is required, because the light transmitting through the liquid crystal will be considerably reduced. The power required for the backlight is almost equal to the power consumption required for driving the liquid crystal cell, the backlight becomes a cause for limiting the operating time in a potable display in which the electric power is supplied by a battery. Moreover, the backlight is not preferable in the respect that it would lead to the fatigue of operator's eyes.

Under the circumstances, the development of a reflective liquid crystal display device of guest-host mode (GH-LCD) in which the backlight is not necessary has been extensively studied. The GH-LCD employs a liquid crystal containing a dichroic dye and is advantageous in that it enables to obtain a bright color display and is relatively wide in angle of visibility.

As for the driving system of LCD, driving by a thin film transistor (TFT) is now getting more popular because of the advantages that it is thin and light and enables to obtain a clear image. In the TFT driving system, a fluorinated liquid crystal can be employed more advantageously because it is highly hydrophobic.

In order to realize a bright and clear color display in the GH-LCD, the liquid crystal is required to contain a large quantity of dichroic dye so as to represent high absorbance. Accordingly, the dichroic dye is required to have high solubility and dissolution stability in relative to the liquid crystal (in particular, to a fluorinated liquid crystal). Note that, if the cell gap is enlarged so as to compensate a low absorbance, the power consumption would be increased and the response of the liquid crystal to the electric field would be also deteriorated.

Further, in order to realize a GH-LCD driven by TFT, it is very important that the liquid crystal has a high voltage holding capacity. In order to ensure this property, the resistance of the liquid crystal layer is required to be sufficiently high. However, there is a problem in this case that the resistance as well as the voltage holding capacity of the liquid crystal layer may be extremely deteriorated due to a photo-degradation of the dichroic dye mixed in the liquid crystal. Therefore, the dichroic dye is desired to be excellent in resistance to photo-degradation.

At present, an azo dye or an anthraquinone dye has been mainly employed as a dichroic dye. The azo dye is excellent in linearity of molecule, and thus most azo dyes are excellent in solubility to a liquid crystal having a linear structure. However, the azo dye is defective in that it is poor in resistance to light. On the other hand, the anthraquinone dye is excellent in resistivity to light as compared with the azo dye and hence deemed to be more suited for use in the TFT driving system. However, the conventional anthraquinone dyes are poor in solubility to the liquid crystal.

Meanwhile, there is also known a coumarin dye as a dichroic dye having a high absorption coefficient. However, the conventional coumarin dyes are hardly soluble to the liquid crystal at low temperatures. Therefore, when the LCD is exposed to a low temperature, the coumarin dye is caused to precipitate. Once the coumarin dye is precipitated, it is very difficult to redissolve the coumarin dye into the liquid crystal.

Under the circumstances as mentioned above, many attempts have been made to improve the solubility of anthraquinone dyes and coumarin dyes. However, none of them have been successful to sufficiently improve the solubility of these dyes.

BRIEF SUMMARY OF THE INVENTION

Accordingly, an object of the present invention is to provide a dichroic dye such as an anthraquinone dye and a coumarin dye, which is excellent in resistance to light and in solubility to a liquid crystal.

Another object of the present invention is to provide a liquid crystal display device of guest-host mode which is capable of realizing a bright and clear color display.

According to the present invention, there is provided a liquid crystal display device comprising a pair of substrates having an electrode on a surface thereof, and a liquid crystal layer containing a liquid crystal and a dichroic dye, wherein the dichroic dye is represented by any one of the following formulas (P1) to (P8);

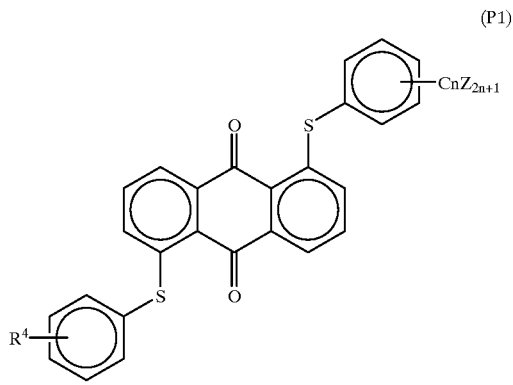

(P2)
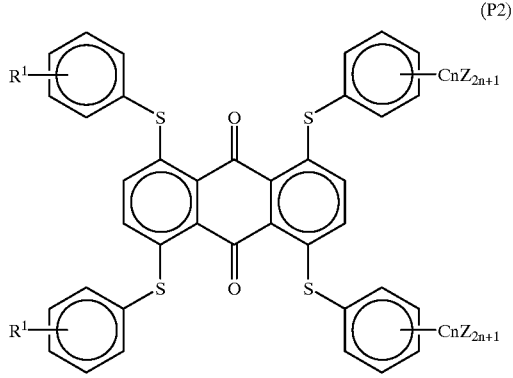

(P3)
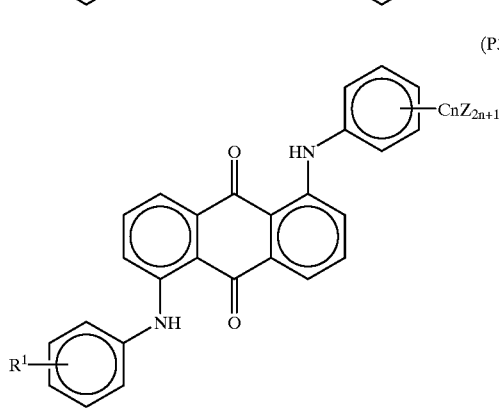

(P4)
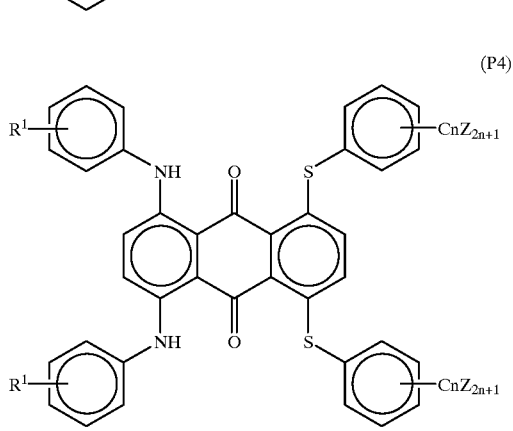

(P5)
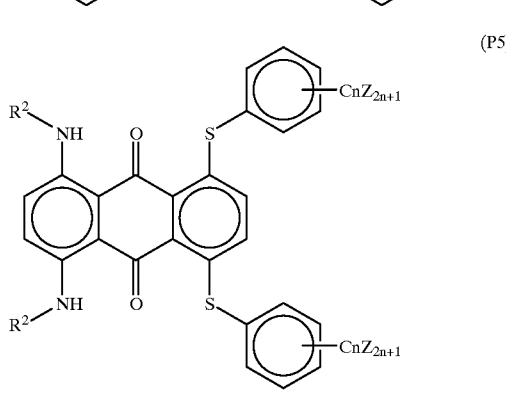

(P6)
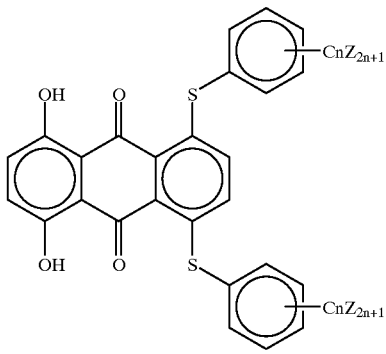

(P7)
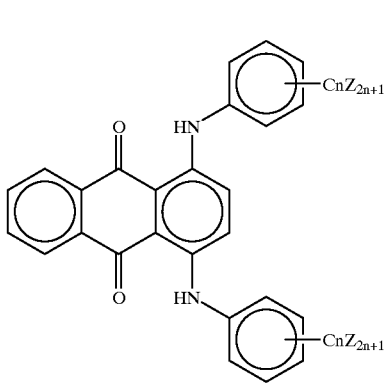

(P8)
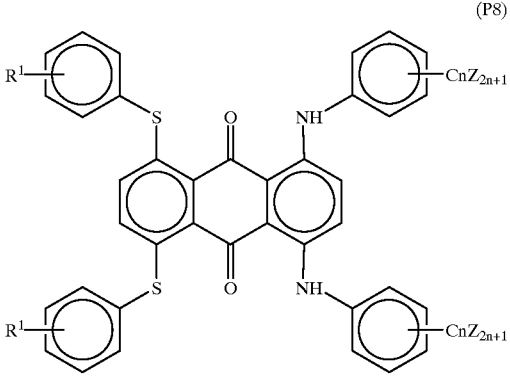

wherein $R^1$ is selected from the group consisting of a hydrogen atom, an alkyl group having not more than 12 carbon atoms, and an aryl group substituted by an alkyl group having not more than 12 carbon atoms; $R^2$ is selected from the group consisting of an alkyl group having not more than 12 carbon atoms, and an aryl group substituted by an alkyl group having not more than 12 carbon atoms; the alkyl group and aryl group may be substituted by a halogen atom respectively; Z is a halogen atom; and n is an integer of 1 to 12.

According to the present invention, there is further provided a liquid crystal display device comprising a pair of substrates having an electrode on a surface thereof, and a liquid crystal layer containing a liquid crystal and a dichroic dye, wherein the dichroic dye is represented by any one of the following formulas (T1) to (T5);

(T1)
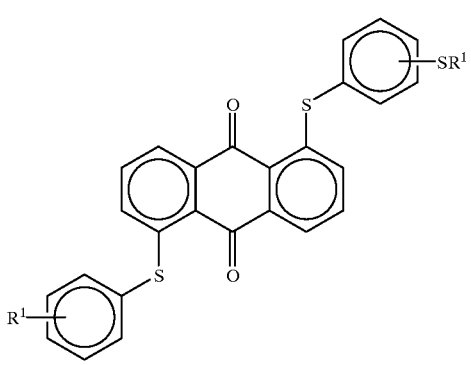

(T2)
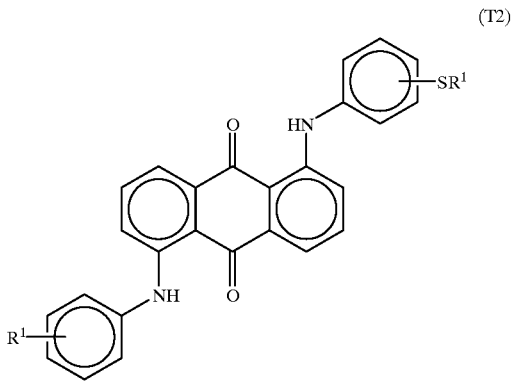

(T3)
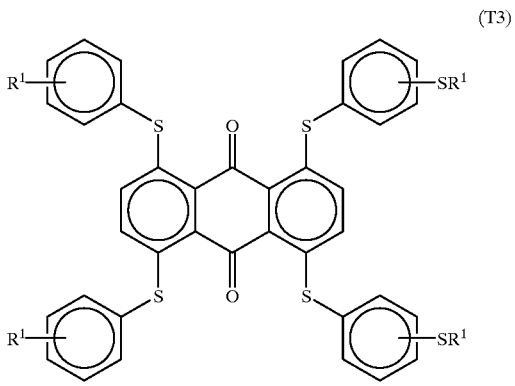

(T4)
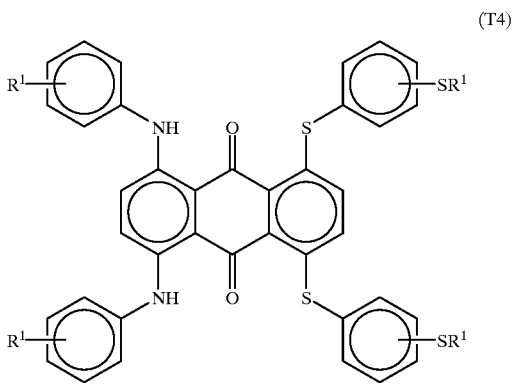

-continued (T5)
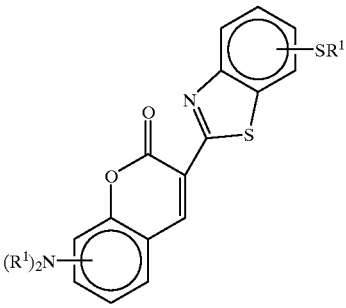

wherein $R^1$ is selected from the group consisting of a hydrogen atom, alkyl group having not more than 12 carbon atoms, and an aryl group substituted by an alkyl group having not more than 12 carbon atoms.

According to the present invention, there is further provided a liquid crystal display device comprising a pair of substrates having an electrode on a surface thereof, and a liquid crystal layer containing a liquid crystal and a dichroic dye, wherein the dichroic dye is an anthraquinone dye having 0.08 or less of Y value represented by the following equation;

$$Y=\{\Sigma\Delta H\ tr,m/268-\Sigma\Delta S\ tr,m\}(kJK^{-1}kg^{-1})$$

wherein $\Sigma\Delta H$ tr,m is a sum of an enthalpy change of transition from −5° C. to the melting point and an enthalpy change of melting per unit weight; and $\Sigma\Delta S$ tr,m is a sum of an entropy change of transition from −5° C. to the melting point and an entropy change of melting per unit weight. More preferably, the anthraquinone dye should have 0.07 or less of Y value.

Such an anthraquinone dye can be selected from those represented by the following formula (A1).

(A1)
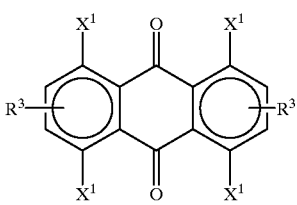

wherein $X^1$ is selected from the group consisting of H, OH, SR or NHR (R is selected from the group consisting of H, an alkyl group and an aryl group) with a proviso that at least two of $X^1$s groups are OH, SR or NHR; $R^3$ is selected from the group consisting of a hydrogen atom, an alkyl group, an aryl group, an alkoxyl group and a thioalkoxyl group; the alkyl group may be substituted by a halogen atom; and the aryl group may be heterocyclic group.

Other examples of such an anthraquinone dye are those represented by any one of the following formulas (A2) to (A4):

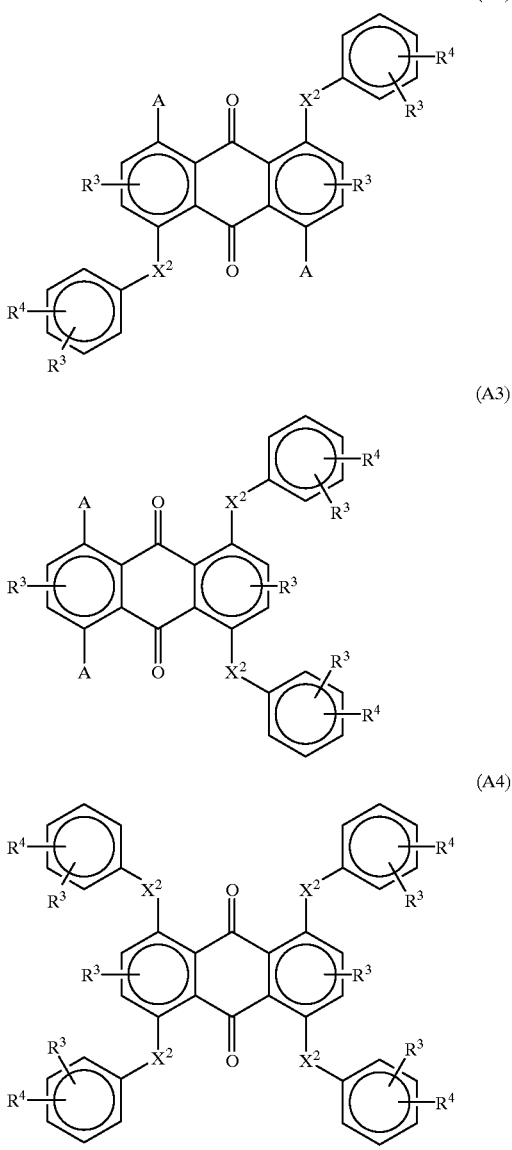

wherein $X^2$ is selected from the group consisting of S and NH; A is selected from the group consisting of H, OH and NHR (R is selected from the group consisting of H, an alkyl group and an aryl group); $R^3$ is selected from the group consisting of a hydrogen atom, an alkyl group, an aryl group, an alkoxyl group and a thioalkoxyl group; and $R^4$ is selected from the group consisting of a hydrogen atom, a perfluoroalkyl group, a cyano group and a nitro group.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
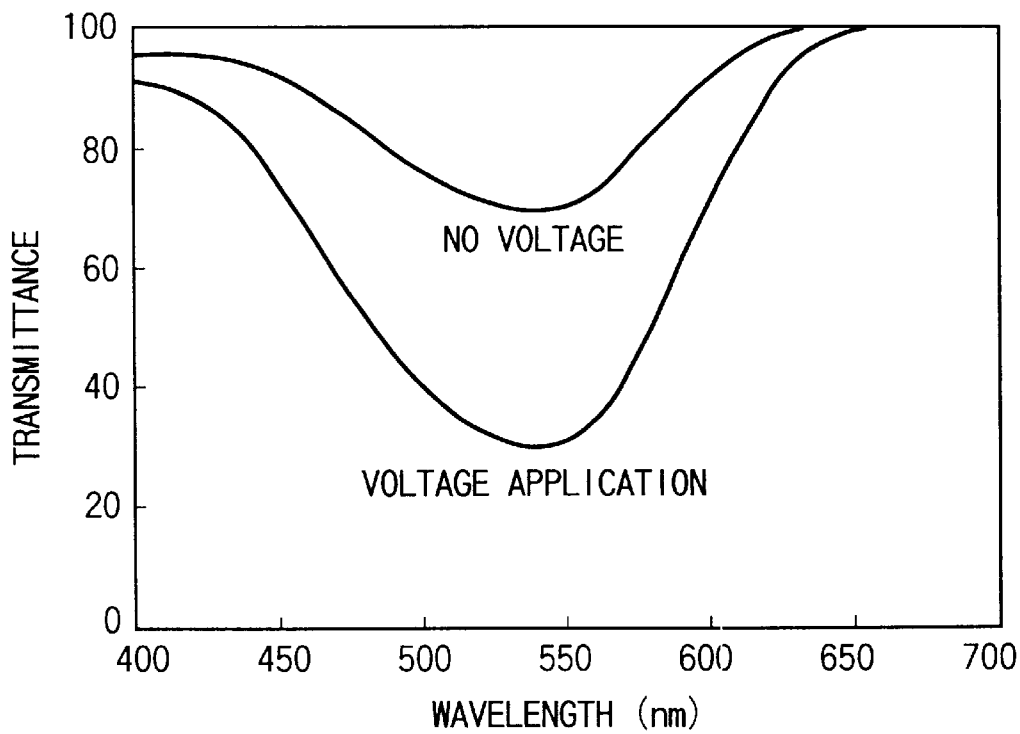
FIG. 1 is a graph showing the transmittance of a GH-LCD employing a dichroic dye (P2E1) according to this invention.

This invention will be further explained in detail as follows.

The dichroic dye employed in this invention is an anthraquinone dye represented by any one of the aforementioned formulas (P1) to (P8). The substituent groups shown in the formulas (P1) to (P8) are as follows: $R^1$ is selected from the group consisting of a hydrogen atom, an alkyl group having not more than 12 carbon atoms, and an aryl group substituted by an alkyl group having not more than 12 carbon atoms. $R^2$ is selected from the group consisting of an alkyl group having not more than 12 carbon atoms, and an aryl group substituted by an alkyl group having not more than 12 carbon atoms. The alkyl group and aryl group to be included in $R^1$ and $R^2$ may be substituted by a halogen atom. In view of solubility of the dichroic dye to a liquid crystal, $R^1$ and $R^2$ should preferably be selected from alkyl groups having 1 to 4 carbon atoms. In particular, $R^1$ should preferably be selected from t-butyl group and n-butyl group. Z represents a halogen atom. Typical example of $C_nZ_{2n+1}$ is $C_nF_{2n+1}$ (a perfluoroalkyl group). The n representing the number of carbon atoms of this group is an integer of 1 to 12. More preferably, n should be in the range of 1 to 4.

Another dichroic dye employed in this invention is anthraquinone dye or coumarin dye represented by any one of the aforementioned formulas (T1) to (T5).

The substituent group $R^1$ in the formulas (T1) to (T5) is selected from the group consisting of a hydrogen atom, an alkyl group having not more than 12 carbon atoms, and an aryl group substituted by an alkyl group having not more than 12 carbon atoms.

The followings are supplementary explanations on the dichroic dyes represented by the aforementioned formulas (P1) to (P8) and (T1) to (T5). In the following explanations, a perfluoroalkyl group is used as the substituent group $C_nZ_{2n+1}$.

The dichroic dye represented by the formula (P1) is a yellow dye the anthrqauinone skeleton of which has thiophenyl groups at the 1 and 5 positions, one of the thiophenyl group being substituted by a perfluoroalkyl group and the other thiophenyl group being substituted by an $R^1$ group.

The dichroic dye represented by the formula (P2) is a magenta dye the anthraquinone skeleton of which has thiophenyl groups at the 1, 4, 5 and 8 positions, the thiophenyl groups at the 1 and 4 positions being substituted by a perfluoroalkyl group and the thiophenyl groups at the 5 and 8 positions being substituted by an $R^1$ group.

The dichroic dye represented by the formula (P3) is a magenta dye the anthraquinone skeleton of which has anilino groups at the 1 and 5 positions, the anilino group at the 1 position being substituted by a perfluoroalkyl group and the anilino group at the 5 position being substituted by an $R^1$ group.

The dichroic dye represented by the formula (P4) is a cyan dye the anthraquinone skeleton of which has thiophenyl groups at the 1 and 4 positions and anilino groups at the 5 and 8 positions, the thiophenyl groups at the 1 and 4 positions being substituted by a perfluoroalkyl group and the anilino groups at the 5 and 8 positions being substituted by an $R^1$ group.

The dichroic dye represented by the formula (P5) is a cyan dye the anthraquinone skeleton of which has thiophenyl groups at the 1 and 4 positions and secondary amino group at 5 and 8 positions, the thiophenyl groups at the 1 and 4 positions being substituted by a perfluoroalkyl group and the secondary amino group at the 5 and 8 positions being substituted by an $R^2$ group.

The dichroic dye represented by the formula (P6) is a magenta dye the anthraquinone skeleton of which has thiophenyl groups at the 1 and 4 positions and hydroxyl groups at the 5 and 8 positions the thiophenyl groups at the 1 and 4 positions being substituted by a perfluoroalkyl group.

The dichroic dye represented by the formula (P7) is a cyan dye the anthraquinone skeleton of which has anilino groups at the 1 and 4 positions, the anilino groups being substituted by a perfluoroalkyl group.

The dichroic dye represented by the formula (P8) is a cyan dye the anthraquinone skeleton of which has anilino groups at the 1 and 4 positions and thiophenyl groups at the 5 and 8 positions, the anilino groups at the 1 and 4 positions being substituted by a perfluoroalkyl group and the thiophenyl groups at the 5 and 8 positions being substituted by an $R^1$ group.

The perfluoroalkyl groups in the formulas (P1) to (P8) should preferably be at the meta-position, while the $R^1$ groups should preferably be at the para-position.

The dichroic dye represented by the formula (T1) is a yellow dye the anthrqauinone skeleton of which has thiophenyl groups at the 1 and 5 positions the thiophenyl groups at the 1 position being substituted by an $SR^1$ group and the thiophenyl group at the 5 position being substituted by an $R^1$ group.

The dichroic dye represented by the formula (T2) is a magenta dye the anthraquinone skeleton of which has anilino groups at the 1 and 5 positions the anilino group at the 1 position being substituted by an $SR^1$ group and the anilino group at the 5 position being substituted by an $R^1$ group.

The dichroic dye represented by the formula (T3) is a magenta dye the anthraquinone skeleton of which has thiophenyl groups at the 1, 4, 5 and 8 positions, the thiophenyl groups at the 1 and 4 positions being substituted by an $SR^1$ group and the thiophenyl groups at the 5 and 8 positions being substituted by an $R^1$ group.

The dichroic dye represented by the formula (T4) is a cyan dye the anthraquinone skeleton of which has thiophenyl groups at the 1 and 4 positions and anilino groups at the 5 and 8 positions, the thiophenyl groups at the 1 and 4 positions being substituted by an $SR^1$ group and the anilino groups at the 5 and 8 positions being substituted by an R1 group.

The dichroic dye represented by the formula (T5) is a coumarin derivative in which benzene rings on both ends are substituted by an $SR^1$ group and secondary amino group, respectively.

All of the aforementioned dichroic dyes are excellent in solubility to a liquid crystal (in particular, to a fluorinated liquid crystal). When the dichroic dyes of this invention is dissolved in a liquid crystal up to a concentration exceeding a solubility at room temperature by heating, followed by cooling, the dye is not precipitated. Therefore, the dichroic dye is stably retained in the liquid crystal even under the supersaturated condition. This means that the dichroic dye is highly amorphous. Furthermore, the dichroic dye is highly resistive to light, so that the deterioration in voltage holding capacity of the liquid crystal due to a light irradiation can be suppressed.

The reason for the improvement in solubility to a liquid crystal of the dichroic dye represented by any one of the formulas (P1) to (P8) where $R^1$ or $R^2$ is, for example, t-butyl group can be ascribed to the fact that the asymmetry in molecular structure along the molecular axis of the dye becomes more prominent, the hydrophobicity of the molecule is enhanced by the introduction of the perfluoroalkyl group, and the electrostatic interaction between the perfluoroalkyl group and the liquid crystal molecule is enhanced because of the localized dipole of the group.

The reason for the improvement in solubility to a liquid crystal of the dichroic dye represented by any one of the formulas (T1) to (T5) can be ascribed to the effect brought about by the introduction of the $SR^1$ group.

There has been conventionally attempted to improve the solubility of anthraquinone dye to a liquid crystal by introducing an alkyl group into the anthraquinone. The solubility of the dye to a liquid crystal can be certainly improved near the room temperature, whereas the solubility can hardly be improved under the lower temperature. The reason for this may be attributed to the fact that since the mobility of methylene chain is reduced at lower temperatures, the effect of alkyl group to improve the solubility is substantially lost.

Since the dichroic dye according to this invention is capable of exhibiting a color of yellow, magenta or cyan, it is possible to obtain mixed dyes exhibiting various colors by mixing two or more kinds of dichroic dye each differing in color. For example, by mixing a yellow dye with a magenta dye, a red dye can be obtained. By mixing a yellow dye with a cyan dye, a green dye can be obtained. By mixing a magenta dye with a cyan dye, a blue dye can be obtained. By mixing a yellow dye, a magenta dye and a cyan dye together, a black dye can be obtained.

With respect to the anthraquinone dye according to this invention, it is possible to estimate the solubility of the dye to a liquid crystal from thermodynamic parameters based on the amorphous theory for low molecular weight compound (Chemistry of Materials, Vol. 6, pp. 2343, 1994) by the present inventor. Therefore, it is possible to easily select an anthraquinone dye exhibiting an excellent solubility.

The anthraquinone dye according to this invention exhibits 0.08 or less of Y value in the following equation;

$$Y = \{\Sigma\Delta H\ tr,m/268 - \Sigma\Delta S\ tr,m\}\ (kJK^{-1}kg^{-1})$$

wherein $\Sigma\Delta H$ tr,m is a sum of an enthalpy change of transition from $-5°$ C. to the melting point and an enthalpy change of melting per unit weight; and $\Sigma\Delta S$ tr,m is a sum of an entropy change of transition from $-5°$ C. to the melting point and an entropy change of melting per unit weight.

Next, the solubility of a dichroic dye to a liquid crystal will be discussed based on the amorphous theory for a low molecular weight compound.

In order to maintain an equilibrium state between a material "A" in pure solid phase and a solution containing the material "A", the chemical potential $\mu$ of the material "A" is required to be the same in both phases. This condition can be represented by the following equation:

$$\mu_A^{*S} = \mu_A^L$$

The chemical potential $\mu$ of the material "A" in an ideal solution can be represented by the following equation:

$$\mu_A^L = \mu_A^{*L} + RT\ln X_A$$

wherein $\mu_A^{*L}$ is a chemical potential of the material "A" in a pure liquid phase, and $X_A$ is a molar fraction.

Accordingly, the condition for the equilibrium can be represented by the following equation (1):

$$\mu_A^{*S} = \mu_A^{*L} + RT\ln X_A \qquad (1)$$

wherein $\mu_A^{*S}$ is a chemical potential (molar free energy) of the material "A" in a pure solid phase, and $\mu_A^{*L}$ is a chemical potential of the material "A" in a pure liquid phase.

Accordingly, the equation (1) can be expressed by the following equation (2).

$$(G_A^{*S} - G_A^{*L})/RT = \ln X_A \qquad (2)$$

Herein, $$\partial(G/T)/\partial T = -H/T^2$$

Therefore, when the equation (2) is differentiated with respect to T, the following equation (3) can be obtained.

$$(H_A^{*S} - H_A^{*L})/RT^2 = \Delta H_f/RT^2 = \partial \ln X_A/\partial T \qquad (3)$$

wherein $\Delta H_f$ is an enthalpy change of melting. As far as not so wide range of temperature is concerned, the $\Delta H_f$ is assumed to be independent on T. If the equation (3) is integrated from the temperature where $X_A = 1$, i.e., the melting point $T_m$ of the material "A" in a pure solid phase to the temperature T where the material "A" in a pure solid phase is in equilibrium with a solution containing the material "A" in a molar fraction $X_A$, the following equation (4) can be obtained.

$$(\Delta H_f/R)(1/T_m - 1/T) = -(\Delta H_f - T\Delta S_f)/RT = \ln X_A$$

$$-\ln X_A = (\Delta H_f - T\Delta S_f)/RT \qquad (4)$$

This equation (4) indicates that, in the case of ideal solution, the solubility can be determined by the thermodynamic parameter of melting of pure material "A" irrespective of the kinds of solvent.

If a real solution is to be expressed, an activity coefficient $\gamma_A$ is introduced and hence the following equation (5) is adopted in place of the equation (4).

$$-(\Delta H_f - T\Delta S_f)/RT = \ln \gamma_A X_A$$

$$-\ln X_A = (\Delta H_f - T\Delta S_f)/RT + \ln \gamma_A \qquad (5)$$

The process in which a solid is dissolved in a solvent can be imaginatively separated into the following two steps: (i) a step in which solid state molecules in a crystalline arrangement are separated from each other to be turned into liquid, and (ii) a step in which the molecules are mixed with the solvent. The $(\Delta H_f - T\Delta S_f)$ in the equation (5) denotes a difference in molar free energy between the material "A" in pure solid phase and the material "A" in pure liquid phase (or in a supercooled liquid if $T<T_m$) at a temperature T, and hence is similar to the step (i). On the other hand, the $RT\ln\gamma_A$ denotes approximately a partial molar heat of mixing. Some of dye molecules undergo a solid-solid phase transition before they are dissolved. Therefore, the real thermodynamic parameter should be determined by taking into account the sum ranging from the temperature T to the melting point $T_m$ ($\Sigma\Delta H$ tr,m; $\Sigma\Delta S$ tr,m).

The solute in the ideal solution is assumed to behave as a single motion unit just like a rigid sphere. Whereas a molecule consisting of plural motion units just like a structure in which plural rigid spheres are connected to each other with flexible bounds cannot meet the condition defined by the equation (5). In particular, since the $T_m$ of dye molecule is higher than room temperature, the elemental step (i) in the process of dissolution would be a change from a crystal to a supercooled liquid. According to the amorphous theory for a low molecular weight compound, the molecular motion in a supercooled liquid is determined not by a difference in free energy of the entire molecule but by a difference in free energy per motion unit. However, in a dye molecule having a complicated structure, it is very difficult to accurately determine as to which portion thereof constitutes the motion unit. On the other hand, when the size of molecule (molecular weight Mw) becomes larger, the number of motion unit is assumed to be increased correspondingly. Moreover, in a dye molecule or a liquid crystal molecule, the structures which give an influence on the solubility (such as hydrophilic group and hydrophobic group) exist heterogeneously. In view of these aspects, the free energy per unit weight which can be obtained by dividing the molar free energy by the molecular weight Mw becomes very important with respect to the free energy for plural motion units. The free energy per unit weight can be evaluated with respect to a dye or a mixed dye the molecular weight of which is unknown by means of $\Delta H_f$ and $\Delta S_f$ which can be measured by an ordinary differential scanning calorimeter (DSC).

In the case of the guest-host liquid crystal composition according to this invention, a dye molecule tends to be precipitated at lower temperatures. Accordingly, the basis of sufficient solubility of anthraquinone dye to a liquid crystal according to this invention is set such that the solubility of anthraquinone dye to a liquid crystal at a temperature of $-5°$ C. should be 1% by weight or more. In this case, when the sum of an enthalpy change of transition from $-5°$ C. (268K) to the melting point and an enthalpy change of melting per unit weight is expressed as $\Sigma\Delta H$ tr,m, and the sum of an entropy change of transition from $-5°$ C. to the melting point and an entropy change of melting per unit weight is expressed as $\Sigma\Delta S$ tr,m, the solubility of anthraquinone dye to a liquid crystal can be evaluated by the equation, $Y = \{\Sigma\Delta H\ tr,m/268 - \Sigma\Delta S\ tr,m\}$ $(kJK^{-1}kg^{-1})$, i.e., the smaller the Y value is, the larger the solubility of the anthraquinone dye. It has been found as a result of the experiments performed by the present inventors that, in order to realize 1% by weight or more in solubility of anthraquinone dye to a liquid crystal at a temperature of −5° C., the Y value should be 0.08 or less, more preferably 0.07 or less.

Reducing the Y value means that the value of $\Sigma\Delta H$ tr,m should preferably be lower, and the value of $\Sigma\Delta S$ tr,m should preferably be higher. The qualitative relationship between the thermodynamic parameters of transition and melting and the molecular structure is well known. In order to reduce the value of $\Sigma\Delta H$ tr,m, it would be effective to introduce a bulky and rigid substituent group or sulfur atom into a molecule so as to prevent a packing between molecules or to reduce the dipole moment of the entire molecule. If the value of $\Sigma\Delta H$ tr,m is low, the temperature dependency of the solubility can be minimized. However, when the value of $\Sigma\Delta H$ tr,m is low and hence the interaction between the dye molecules is minimized, the value of $\Sigma\Delta S$ tr,m is also reduced. In order to prevent the value of $\Sigma\Delta S$ tr,m from being reduced, it would be effective to asymmetrically introduce bulky and rigid substituent groups into a dye molecule so as to reduce the number of center of symmetry and to introduce a heavy atom to the terminal position of molecule so as to increase the angular moment and hence to lower the melting point of the molecule.

It is also effective to introduce into asymmetrical positions of anthraquinone dye polar groups selected from cyano group, perfluoroalkyl group, perfluoroalkoxyl group, halogen atom, ester group, carbonyl group, alkoxyl group, thioalkyoxyl group, nitro group and hydroxyl group. The anthraquinone dye having such a structure is effective in enhancing the electrostatic interaction with a polar fluorinated liquid crystal polarity without bringing into an increase in the Y value, thus making it possible to improve the solubility and dichroic ratio. On the other hand, the anthraquinone dye in which plural polar groups are symmetrically introduced is not preferable for use, since it would result in an increase in the value of $\Sigma\Delta H$ tr,m.

From the above viewpoints, candidates for an anthraquinone dye exhibiting a small Y value are those represented by the aforementioned formulas (A1) to (A4). Furthermore, it can be judged from the amorphous theory for a low molecular weight compound that the lower the glass transition point, the slower the crystal growth velocity and the more stable the amorphous state is, the higher the solubility of the dye becomes.

The liquid crystal display device of guest-host mode according to the present invention comprises a pair of substrates having an electrode formed on a surface thereof, and a liquid crystal layer containing a liquid crystal and a dichroic dye, wherein the dichroic dye is anthraquinone dyes or coumarin dyes represented by any one of the formulas (P1) to (P8) and (T1) to (T5), or from anthraquinone dyes exhibiting 0.08 or less of Y value.

As for the liquid crystal employed in this invention, there is any particular restriction as long as the liquid crystal has refractive anisotropy and capable of changing its alignment by an electric field. However, nematic liquid crystal and cholesteric liquid crystal are more preferable. In particular, a fluorinated nematic liquid crystal is most preferable. Specific examples of such a nematic liquid crystal are those represented by the following formulas (LC1) to (LC10). These liquid crystals may be employed singly or in combination of two or more kinds.

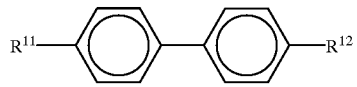 (LC1)

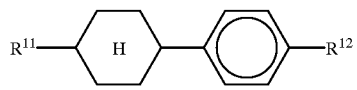 (LC2)

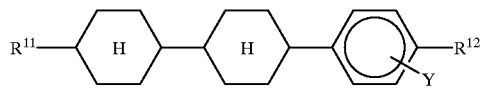 (LC3)

 (LC4)

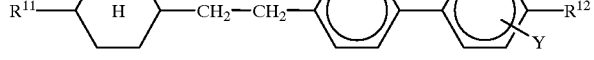 (LC5)

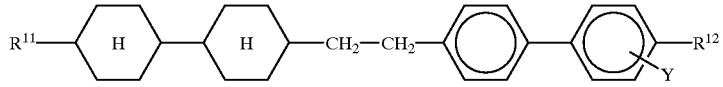 (LC6)

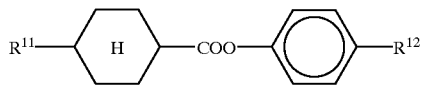
(LC7)

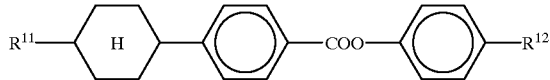
(LC8)

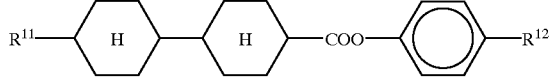
(LC9)

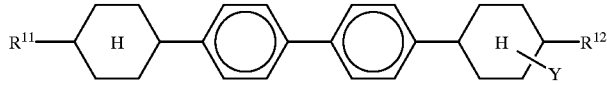
(LC10)

wherein $R^{11}$ and $R^{12}$ are independently selected from the group consisting of an alkyl group, an alkoxyl group, an alkylphenyl group, an alkoxyalkylphenyl group, an alkoxyphenyl group, an alkylcyclohexyl group, an alkoxyalkylcyclohexyl group, an agroupyclohexylphenyl group, a cyanophenyl group, a cyano group, a halogen atom, a fluoromethyl group, a fluoromethoxy group, an alkylphenylalkyl group, an alkoxyalkylphenylalkyl group, an alkoxyalkylcyclohexylalkyl group, an alkoxyalkoxycyclohexylalkyl group, an alkoxyphenylalkyl group and an alkylcyclohexylphenylalkyl group; the substituent groups may have a center of optical activity; the phenyl group or phenoxy group may be substituted by a halogen atom; and Y is selected from the group consisting of a hydrogen atom and a halogen atom.

All of liquid crystals exhibit a positive dielectric anisotropy. Even a liquid crystal exhibiting a negative dielectric anisotropy may be used if the dielectric anisotropy can be turned into positive as a whole when it is mixed with a liquid crystal exhibiting a positive dielectric anisotropy. Further, depending on the structure and driving system of the display device, only a liquid crystal exhibiting a negative dielectric anisotropy may be employed.

It is possible according to the GH-LCD of this invention to construct the liquid crystal layer by making use of a microcapsule containing a liquid crystal and a dichroic dye, thereby facilitating the manufacture of the LCD. For example, in the case of manufacturing a color display by stacking three liquid crystal layers of yellow, magenta and cyan, a transparent electrode layer may be formed on each of the liquid crystal layers by sputtering or printing. Therefore, it is no more required to interpose a glass substrate bearing transparent electrodes between liquid crystal layers, thus making it possible to minimize the displacement of colors.

Furthermore, it is possible, by the employment of microcapsule, to form the liquid layers by means of printing, so that a pattern of liquid crystal layer can be easily formed on the same surface.

It is also possible to stack two liquid crystal layers. In this case, it is possible to attain a monochromatic display and a color display on the same screen by stacking a liquid crystal layer comprising microcapsules exhibiting a first color and another liquid crystal layer comprising microcapsules exhibiting a second color which is a complementary color in relative to the first color, and by suitably controlling the threshold voltages of the upper and lower liquid crystal layers.

As for the method of preparing the microcapsule, a phase separation method, a submerged drying method, an interfacial polymerization method, an in situ polymerization method, a submerged film-forming method and a spray-drying method can be employed.

There is not any particular limitation with regard to the polymer for constituting a shell of the microcapsule, thus various kinds of polymer can be employed.

The material for the polymer may be selected from polyethylene; chlorinated polyethylene; ethylene copolymer such as ethylene-vinyl acetate copolymer, ethylene-acrylic acid-maleic anhydride copolymer; polybutadiene; polyester such as polyethylene terephthalate, polybutylene terephthalate and polyethylene naphthalate; polypropylene; polyisobutylene; polyvinyl chloride; natural rubber; polyvinylidene chloride; polyvinyl acetate; polyvinyl alcohol; polyvinyl acetal; polyvinyl butyral; polytetrafluoroethylene; polytrifluoroethylene; polyfluoroethylene/propylene; polyvinylidene fluoride; polyvinyl fluoride resin; tetrafluoroethylene copolymer such as tetrafluoroethylene-perfluoroalkoxyethylene copolymer, tetrafluoroethylene-hexafluoropropylene copolymer and tetrafluoroethylen-ethylene copolymer; fluorine resin such as fluorine-containing polybenzoxazole; acrylic resin; methacrylic resin; polyacrylonitrile; acrylonitrile copolymer such as acrylonitrile-butadiene-styrene copolymer; polystyrene; styrene-acrylonitrile copolymer; acetal resin; polyamide such as nylon 66; polycarbonate; polyester carbonate; cellulose resin; phenol resin; urea resin; epoxy resin; unsaturated polyester resin; alkyd resin; melamine resin; polyurethane; diaryl phthalate; polyphenylene oxide; polyphenylene sulfide; polysulfone; polyphenylsulfone; silicone resin; polyimide; bismaleimide triazole resin; norbornene-based amorphous polyolefin; and so on.

A reflector may be formed on the outer surface of one of the substrate, or may be formed between one of the substrate and a liquid crystal layer. When the reflector is formed between the substrate and the liquid crystal layer, the aperture ratio can be increased.

EXAMPLES

Example 1

Dichroic dyes represented by the following formulas were employed. In these chemical formulas, the symbol (E) represents Example of this invention, while the symbol (C)

represents Comparative Example, each corresponding to the general formulas (P1) to (P8) and (T1) to (T5).
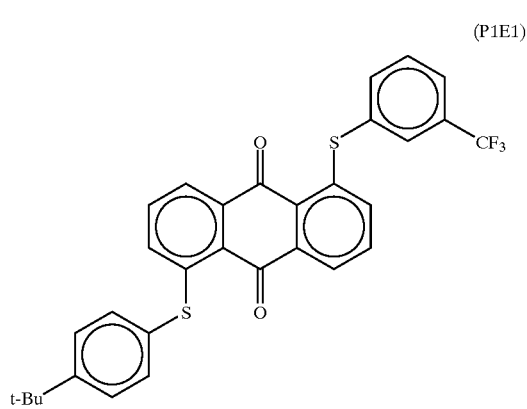
(P1E1)
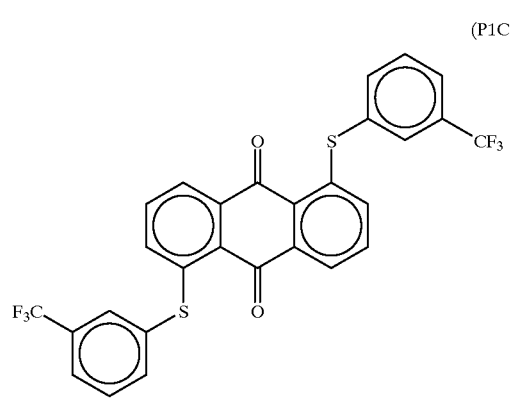
(P1C1)
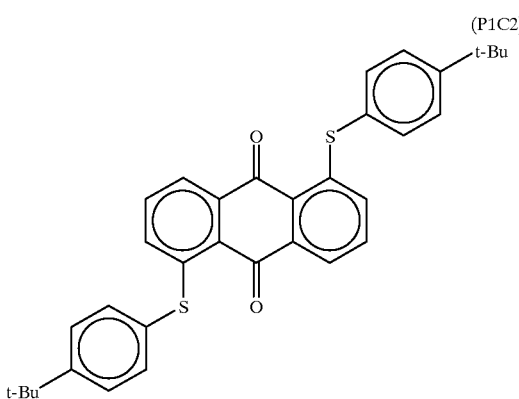
(P1C2)
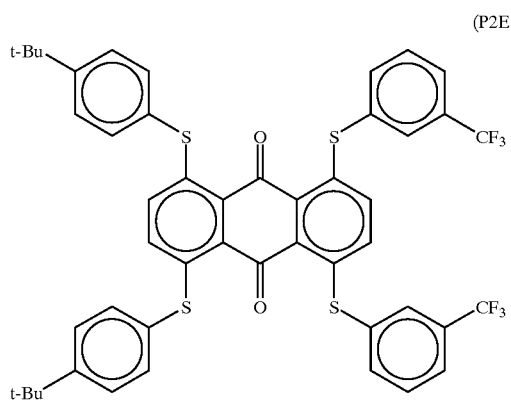
(P2E1)
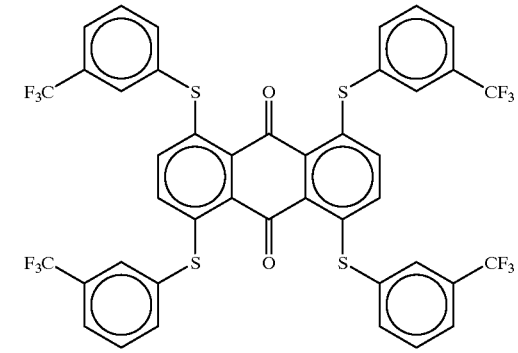
(P2C1)
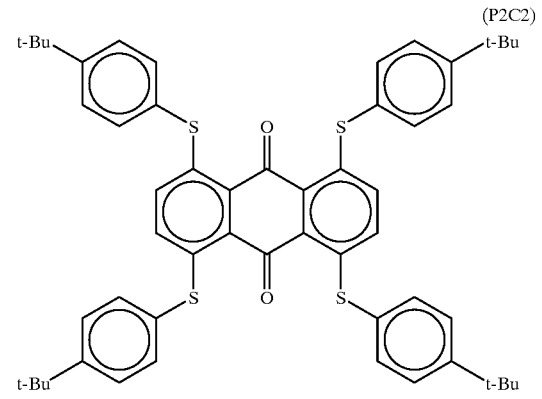
(P2C2)
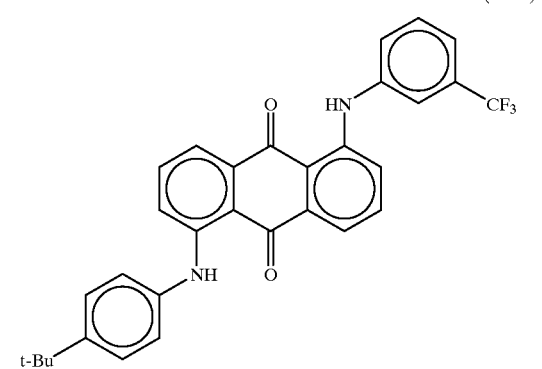
(P3E1)
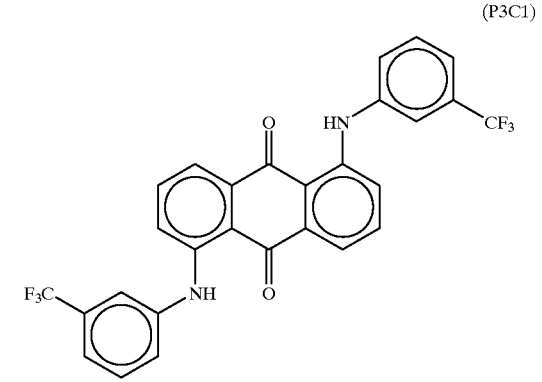
(P3C1)

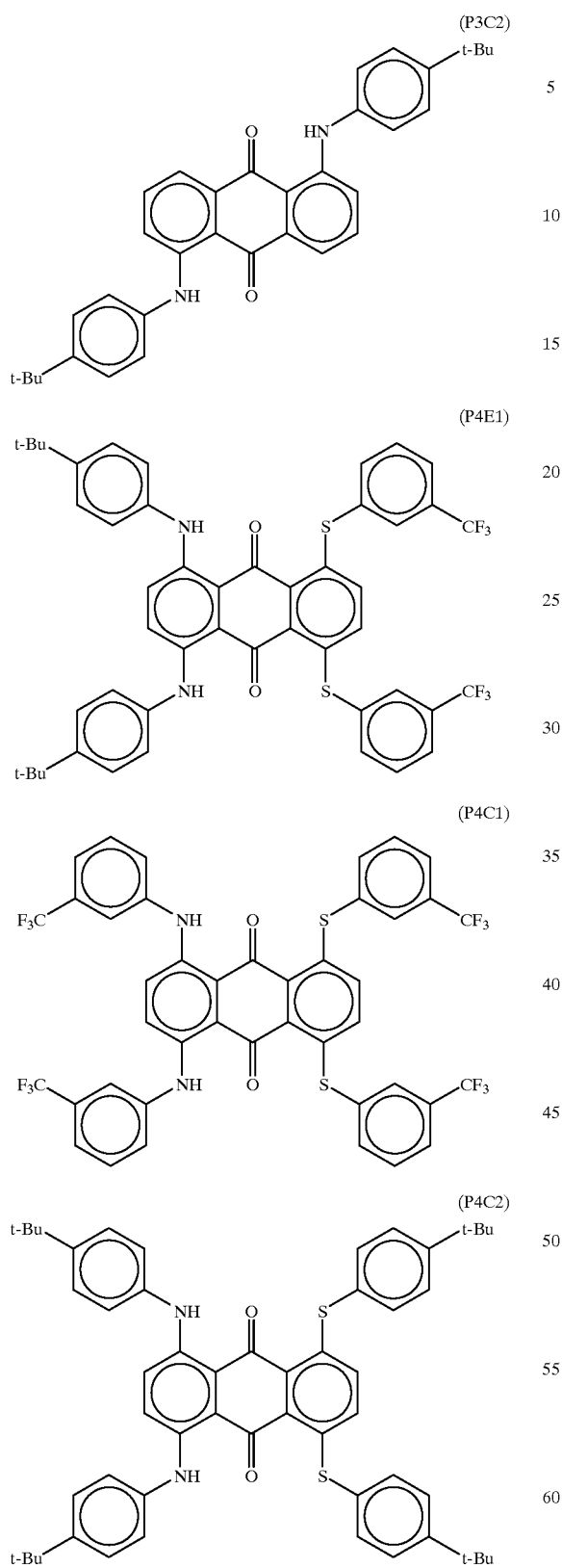

(P6C1)
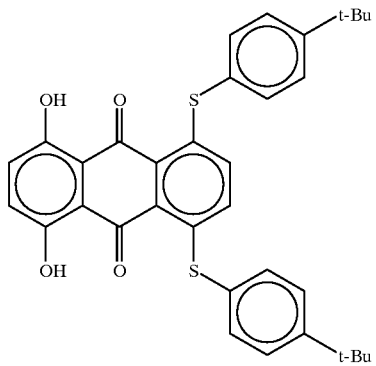
(P6C2)
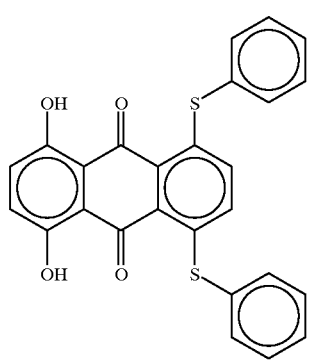
(P7E1)
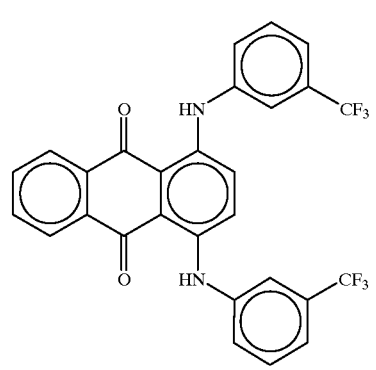
(P7C1)
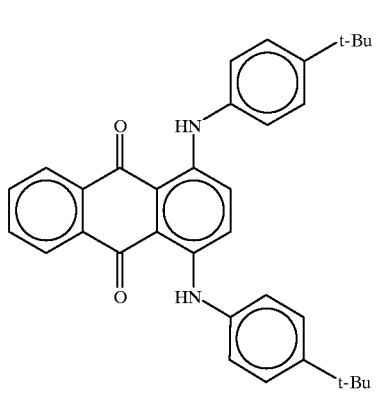
(P7C2)
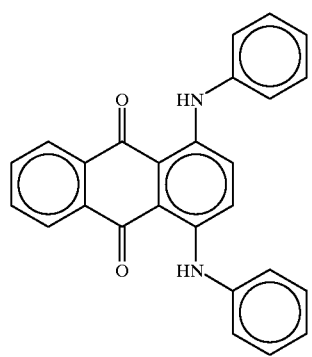
(P8E1)
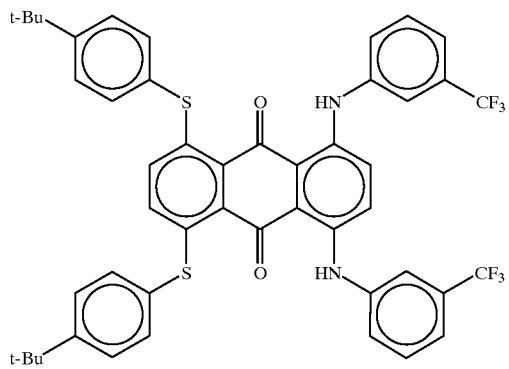
(T1E1)
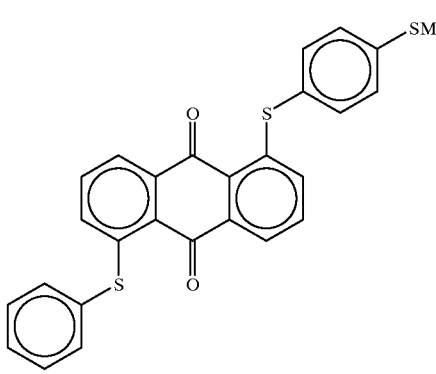
(T1E2)
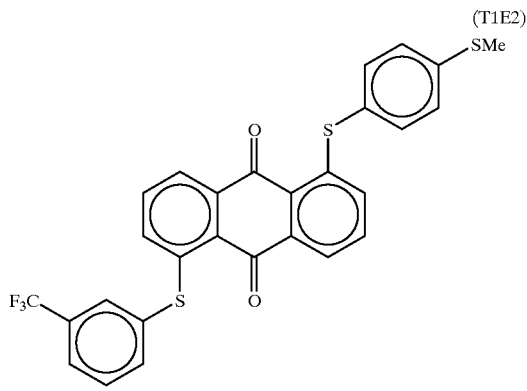

(T1C1)
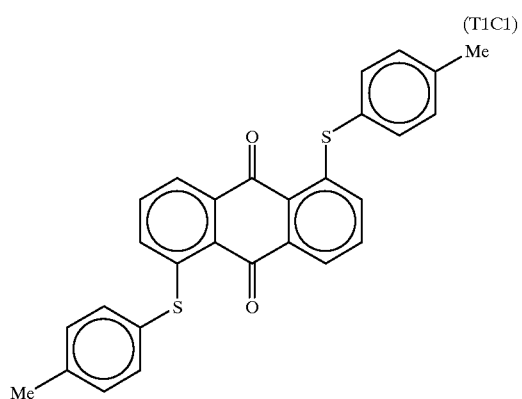
(T2E1)
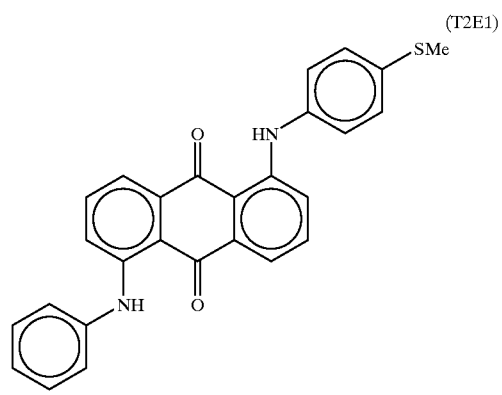
(T2C1)
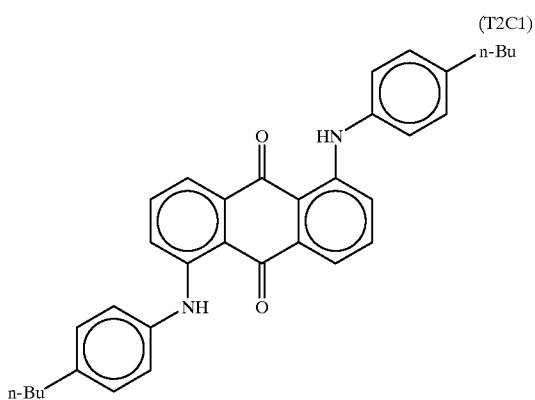
(T3E1)
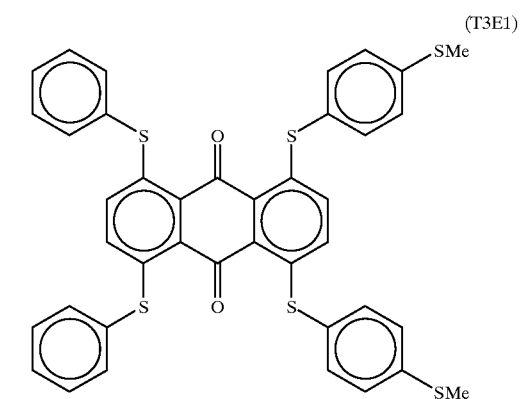
(T3C1)
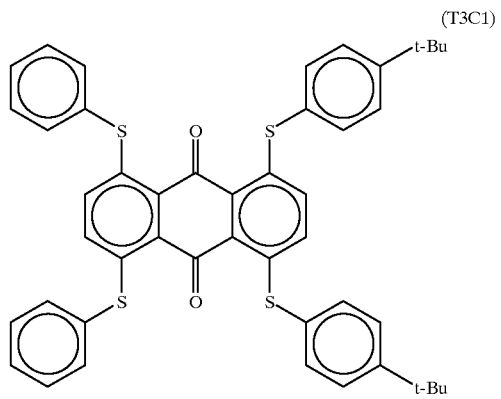
(T4E1)
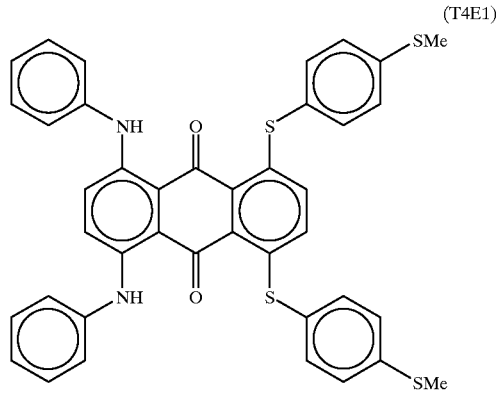
(T4C1)
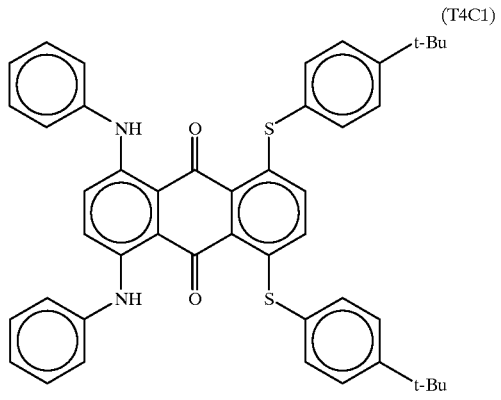
(T5E1)
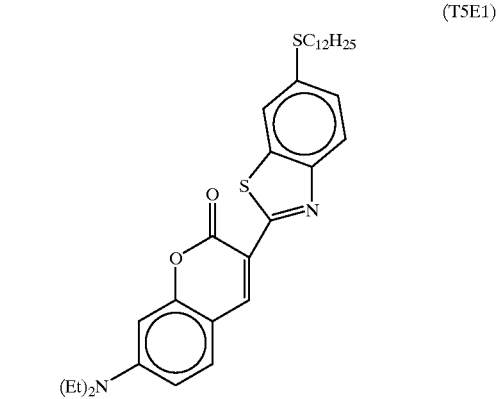

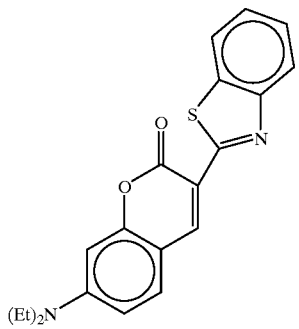

(T5C1)

Next, the synthesis method of some of the dichroic dyes will be explained hereinafter. It should be noted that other dichroic dyes which are not illustrated below can be synthesized in the same manner as explained below.

The synthesis scheme of the dichroic dye (P2E1) will be explained as follows. First, 1,4-dichloro-5,8-dihydroxyanthraquinone was reacted with 4-t-butylthiophenol in DMF containing sodium carbonate in a nitrogen gas atmosphere at about 80° C. for 5 hours. After the DMF was allowed to distill off, pure water was added to the reaction mixture thereby to crystallize the reaction product. Then, this crystallized product was sufficiently washed with pure water and allowed to dry. The product thus dried was then recrystallized in a toluene-hexane mixed solution to obtain 4-t-butylthiophenol derivative. Thereafter, this 4-t-butylthiophenol derivative was allowed to react with tosylchloride (TsCl) for 5 hours at 70° C., and left to stand overnight. The resultant reaction mixture was then poured into pure water thereby to allow the reaction product to precipitate. The crystal thus precipitated was separated through filtration and washed with pure water and then with hexane to obtain a tosylated product. The tosylated product was then reacted with 3-trifluoromethylthiophenol in DMF containing sodium carbonate in a nitrogen gas stream at about 80° C. for 7 hours. After the DMF was allowed to distill off, the reaction product was purified by making use of a wet column employing a mixed solution of hexane/toluene (1:2). Since this reaction accompanies a large quantity of by-products, the product was further purified by making use of a thin layer chromatography (hexane:toluene=1:1) to obtain a magenta dichroic dye (P2E1).

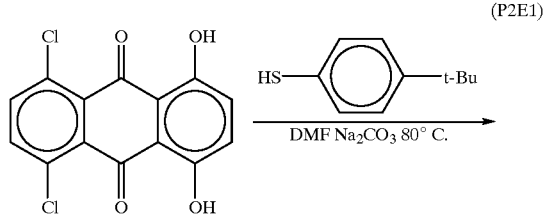

(P2E1)

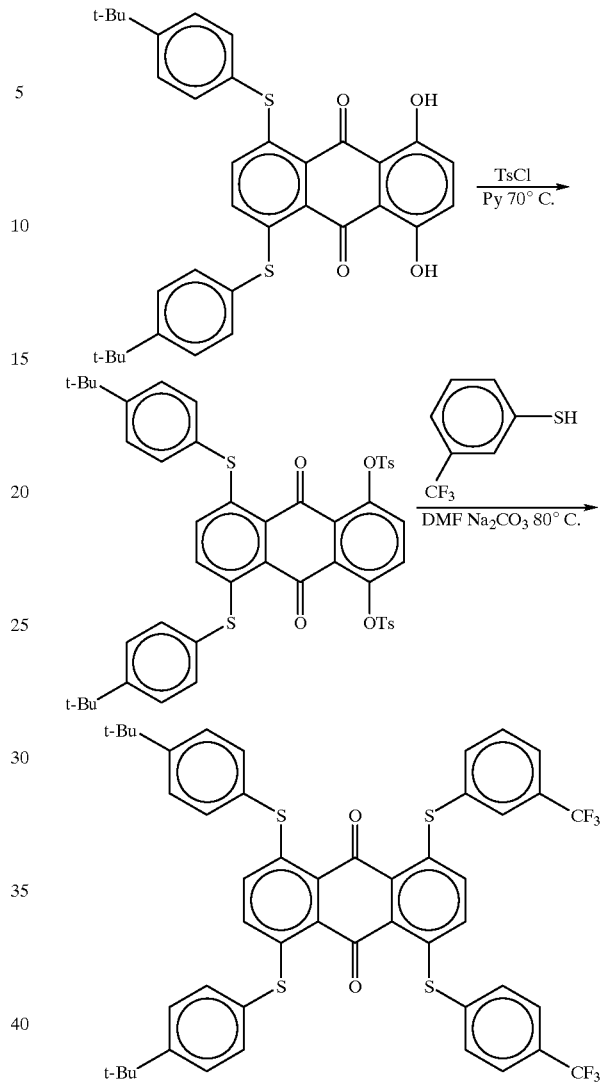

This dichroic dye was then analyzed by means of $^{13}$C-{$^{1}$H} NMR spectrum, the results being shown below.

$^{13}$CNMR(CDCl$_3$) δ(ppm): 31.2 (Me carbon), 34.8 (t-Bu quaternary carbon), 123.5(q) (CF$_3$ carbon), 126.4 (carbon at 4-position of thiophenyl group at 1-position), 127.0 (carbon at meta position of thiophenyl group at 5-position), 128.5 (carbon at 4a-position of anthraquinone skeleton), 129.2 (carbon at 1-position of thiophenyl group at 5-position), 130.3 (carbon at 5-position of thiophenyl group at 1-position), 131.0 (carbon at 2-position of anthraquinone skeleton), 132.4 (carbon at 2-position of thiophenyl group at 1-position), 135.6 (carbon at ortho position of thiophenyl group at 5-position), 139.1 (carbon at 6-position of thiophenyl group at 1-position), 141–145 (carbon at 1-position of anthraquinone skeleton), 153.0 (carbon at para position of thiophenyl group at 5-position), and 183.5 (carbonyl carbon of anthraquinone skeleton).

The synthesis scheme of the dichroic dye (P8E1) will be explained as follows. This dichroic dye (P8E1) was synthesized in the same manner as explained with reference to the dichroic dye (P2E1) except that 3-trifluoromethyl aniline was used in place of 3-trifluoromethyl thiophenol.

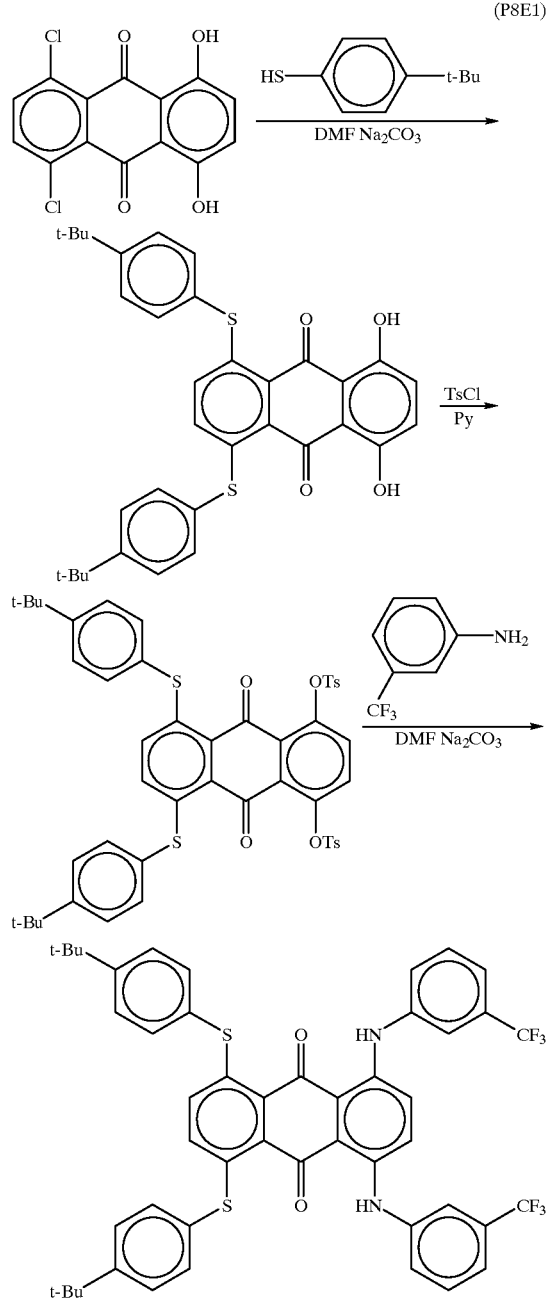

The dichroic dye (T1E1) can be synthesized as follows. First, one equivalent of 1,5-dichloroanthraquinone was reacted with one equivalent of thiophenol in DMF containing sodium carbonate in a nitrogen gas atmosphere at about 80° C. for 3 hours. Then, 1.5 equivalents of 4-methylthiothiophenol was added to the reaction mixture to allow a reaction to take place additionally for 4 hours at 80° C. After the DMF was allowed to distill off, the residual reaction product was dissolved in a little amount of toluene, and then purified by making use of a wet column to obtain the dichroic dye (T1E1).

The dichroic dye (T1E2) was synthesized in the same manner as explained with reference to the dichroic dye (T1E1) except that 3-trifluoromethyl thiophenol was used in place of the thiophenol.

The synthesis scheme of the dichroic dye (T2E1) will be explained as follows. First, one equivalent of 1,5-dihydroxyanthraquinone was reacted with three equivalents of tosyl chloride in pyridine in a nitrogen gas atmosphere at about 80° C. for 5 hours. Then, the reaction product was purified by means of recrystallization and a wet column thereby to obtain a tosylated product. The tosylated product thus obtained was then allowed to react with a mixture (four equivalents) consisting of aniline and 4-methylthioaniline in DMF containing a copper catalyst. Thereafter, the reaction product was purified by means of recrystallization and a wet column thereby to obtain the dichroic dye (T2E1).

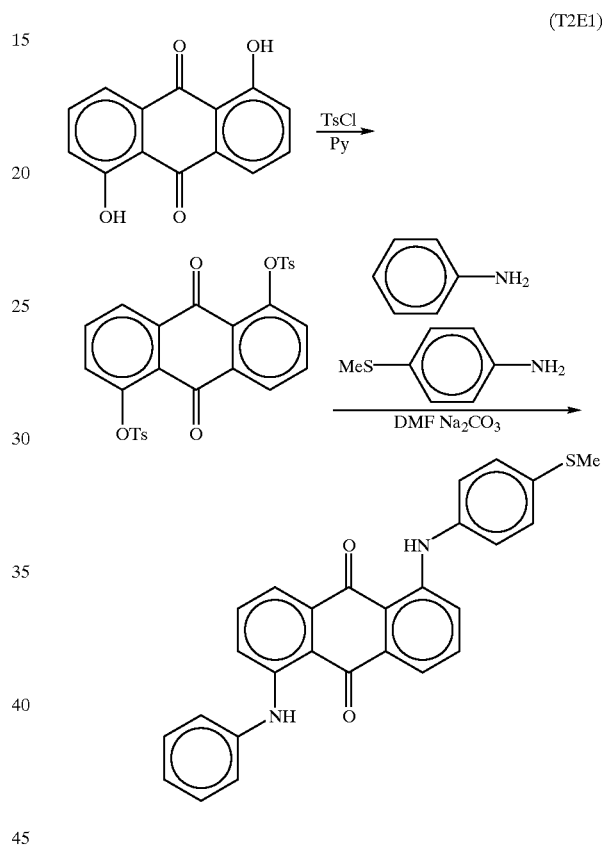

The synthesis scheme of the dichroic dye (T3E1) will be explained as follows. First, one equivalent of 1,4-dichloro-5,8-dihydroxyanthraquinone was reacted with three equivalents of thiophenol in DMF containing sodium carbonate in a nitrogen gas atmosphere at about 80° C. for 5 hours. Then, after the DMF was allowed to distill off, the reaction product was purified by means of recrystallization and a wet column thereby to obtain a thiophenol derivative. Then, the thiophenol derivative was tosylated products and further reacted with 4-methylthiothiophenol to obtain the dichroic dye (T3E1).

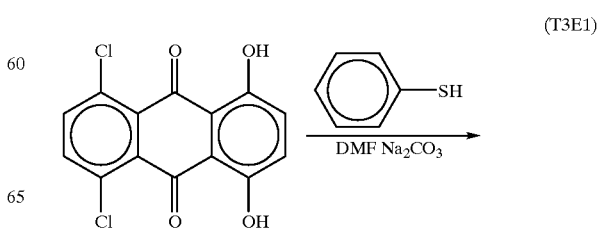

-continued

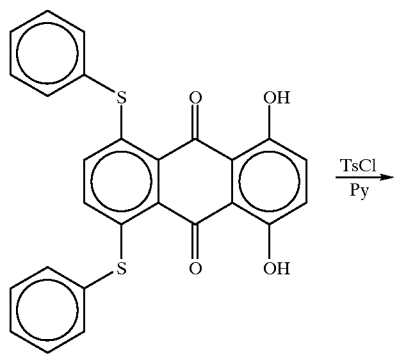

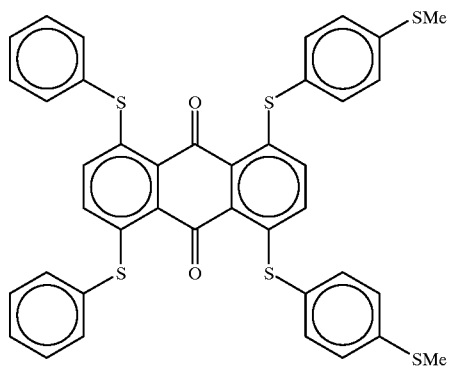

-continued

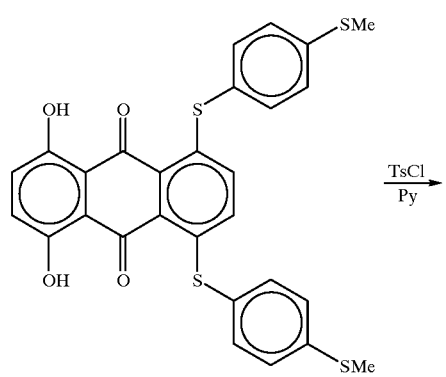

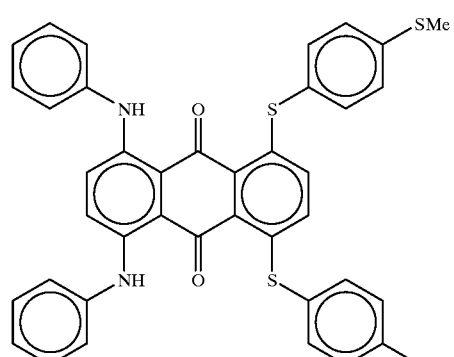

The synthesis scheme of the dichroic dye (T4E1) will be explained as follows. First, one equivalent of 1,4-dichloro-5,8-dihydroxyanthraquinone was reacted with three equivalents of 4-methylthiothiophenol in DMF containing sodium carbonate in a nitrogen gas atmosphere at about 80° C. for 5 hours. Then, after the DMF was allowed to distill off, the reaction product was purified by means of recrystallization and a wet column thereby to obtain a 4-methylthiothiophenol derivative. Then, the 4-methylthiothiophenol derivative was tosylated products and further reacted with aniline to obtain the dichroic dye (T4E1).

The synthesis scheme of the dichroic dye (T5E1) will be explained as follows. First, the coumarin dye (T5C1) was reacted with bromine to obtain a bromide. Then, the bromide was reacted with $C_{12}H_{25}SNa$ in dimethylimidazoline (DMI) to obtain the dichroic dye (T5E1).

(T4E1)

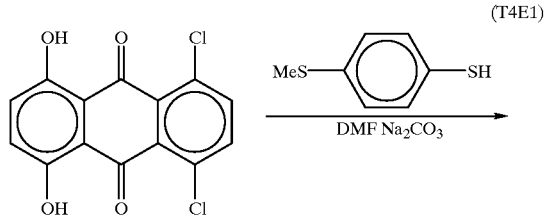

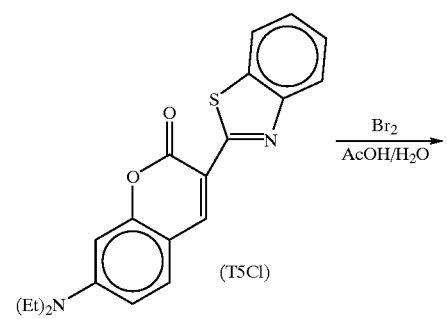

(T5C1)

-continued

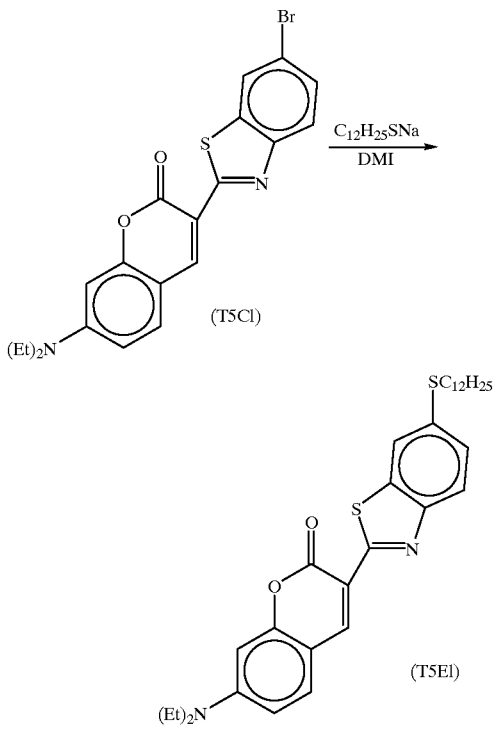

Then, the dichroic dyes shown in Table 1 were evaluated of their solubilities to a liquid crystal. First, each dichroic dye was mixed with a fluorinated liquid crystal (LIXON 5052xx, a product of Chisso Kagaku Kogyo Co.) at predetermined concentration. Each mixture was dissolved in cyclohexane to prepare a 5 mL solution. Then, the absorbance of each solution at the absorption maximum wavelength was measured to obtain an analytical curve. In this case, for the purpose of preparing a sample containing a high concentration of dichroic dye, the liquid crystal was heated so as to allow the dye to be dissolved in the liquid crystal at a concentration exceeding the solubility at room temperature, after which the sample was cooled. Furthermore, for the purpose of obtaining an analytical curve at a region high in absorbance, the absorbance was measured by increasing the weight of sample.

Then, each dichroic dye was mixed with the same fluorinated liquid crystal as mentioned above and the resultant mixture was sufficiently mixed together. The mixture thus obtained was left to stand for 1,000 hours or more. After confirming the precipitation of excessive dye and hence the saturation of the dye in the liquid crystal, the excessive dye was removed by filtration. Then, a predetermined weight of the liquid crystal containing the dye was taken, and then the sample was dissolved in cyclohexane to prepare a 5 mL solution. Then, the absorbance of each solution at the absorption maximum wavelength was measured, and the solubility is obtained based on the analytical curve. The measurement was performed at 24° C. and −5° C., the results being shown in Table 1.

TABLE 1

| Dichroic dye | Solubility (wt %) | |
|---|---|---|
| | 24° C. | −5° C. |
| P1E1 | 5.8 | 3.5 |
| P1C1 | ~0 | — |
| P1C2 | 0.05 | — |
| P2E1 | 1.7 | 1.5 |
| P2C1 | <0.1 | — |
| P2C2 | <0.1 | — |
| P3E1 | 1.6 | 1.4 |
| P3C1 | <0.1 | — |
| P3C2 | <0.1 | — |
| P4E1 | 2.5 | 2.2 |
| P4C1 | <0.1 | — |
| P4C2 | <0.1 | — |
| P5E1 | 1.82 | 1.6 |
| P5C1 | 0.99 | — |
| P5C2 | 0.60 | — |
| P6E1 | 2.5 | 2.1 |
| P6C1 | 0.9 | — |
| P6C2 | 0.6 | — |
| P7E1 | 2.5 | 2.1 |
| P7C1 | 0.9 | — |
| P7C2 | 0.6 | — |
| P8E1 | 2.4 | 1.9 |

From Table 1, the dichroic dyes of Comparative Examples were scarcely soluble or low in solubility to the liquid crystal, whereas the dichroic dyes of Examples were very excellent in solubility to the liquid crystal. Among the dichroic dyes of Comparative Examples, even those having trifluoromethyl groups introduced at both terminal positions indicated a very low solubility to the liquid crystal. In view of these facts, the improvement of solubility of the dichroic dyes according to this invention can be ascribed to the particular molecular structure in which trifluoromethyl group is introduced into one of the terminals while the other terminal of the dye molecule is substituted by alkyl group or left unsubstituted.

Further, in the case of the dichroic dye (P2E1), even when it was dissolved in the liquid crystal at a concentration of 10 wt % or more by mixing then under a heated condition and then left to stand for 1,000 hours at room temperature, it was possible to stably maintain the supersaturated state without precipitation of the dye. By contrast, in the case of the dichroic dyes of Comparative Examples, it was impossible to substantially improve the solubility even under a heated condition, and when the liquid crystals mixed with the dyes were left to stand at room temperature, the dyes were precipitated.

Then, a pair of substrates each having an electrode and a liquid crystal alignment film (for homeotropic alignment) were prepared. After spacers were sprayed on one of the substrates, the pair of substrates were faced to each other and adhered thereby to prepare a cell having a cell gap of about 10 μm. Then, a mixture comprising an n-type liquid crystal material (ZLI-2806, E. Merk Co., Ltd.), a chiral agent (S811, E. Merk Co., Ltd.), a dichroic dye of one of Examples, and another kind of dichroic dye (Nippon Kanko Shikiso Co., Ltd.) was injected into the liquid crystal cell to prepare a liquid crystal display device. This liquid crystal display device was designed to be switched by way of cholesteric-nematic transition.

Then, the voltage holding capacity of these liquid crystal display devices was measured, the results being shown in Table 2. It can be seen from Table 2 that these liquid crystal display devices exhibited a high voltage holding capacity. Note that, a liquid crystal display device prepared by injecting only the liquid crystal material into the liquid crystal cell without employing a dichroic dye has a voltage holding capacity of 99.2%. The voltage holding capacity of these liquid crystal display devices was not deteriorated even after exposure to light of 500 MJ/m$^2$ by making use of a xenon lamp, thus indicating an excellent stability to light.

TABLE 2

| Dichroic dye | Voltage holding capacity (%) |
|---|---|
| P1E1 | 99.1 |
| P2E1 | 99.0 |
| P3E1 | 99.0 |
| P4E1 | 99.1 |
| P5E1 | 98.9 |
| P6E1 | 98.7 |
| P7E1 | 99.0 |
| P8E1 | 99.1 |

The transmittance of the liquid crystal display device using the dichroic dye (P2E1) was measured under conditions of with and without voltage application, the results being shown in FIG. 1.

Further, the dichroic dyes shown in Table 3 were evaluated as follows on the solubility to a liquid crystal and on the voltage holding capacity. Namely, a sufficient quantity of each dichroic dye was added to a fluorinated liquid crystal (LIXON5052xx, Chisso Kagaku Kogyo Co., Ltd.) and stirred for 240 hours at a predetermined temperature (24° C. and −5° C.) thereby allowing the dichroic dye to be dissolved in the liquid crystal in a saturated state. Then, the resultant colored liquid crystal composition was filtered through a 0.2 μm filter thereby to remove the precipitated dichroic dye. Subsequently, the analysis on the absorbance of each colored liquid crystal composition was performed to determine the solubility of each dichroic dye. In addition, a liquid crystal cell having a cell gap of 10 μm was assembled by making use of a transparent substrate which was not provided with an alignment film. Then, a colored liquid crystal composition containing a dichroic dye at a concentration of 1 wt % was injected into the liquid crystal cell. Then, the voltage holding capacity of the liquid crystal cell thus obtained was measured at 50° C., the results being shown in Table 3.

TABLE 3

| Dichroic dye | Solubility (wt %) | | Voltage holding capacity (%) |
|---|---|---|---|
| | 24° C. | −5° C. | |
| T1E1 | 1.50 | 1.00 | 98 |
| T1E2 | 2.50 | 1.75 | 99 |
| T1C1 | <0.1 | 0 | — |
| T2E1 | 1.60 | 1.05 | 98 |
| T2C1 | 2.30 | 0.1 | 98 |
| T3E1 | 2.00 | 1.35 | 98 |
| T3C1 | 2.00 | 0.5 | 98 |
| T4E1 | 3.10 | 2.10 | 98 |
| T4C1 | 2.30 | 0.60 | 98 |
| T5E1 | 3.00 | 1.85 | 98 |
| T5C1 | 0.28 | 0.02 | 98 |

From Table 3, in the case of dichroic dyes of 15 Comparative Examples, even if the solubility of some of them was relatively high at room temperature, the solubility at −5° C. was very low. Whereas, the dichroic dyes of Examples exhibited a high solubility at −5° C. Further, the dye (T1E2) having a molecular structure in which a perfluoroalkyl group was introduced at a terminal position of (T1E1) exhibited a more excellent solubility than that of (T1E1). An improvement of solubility by the introduction of perfluoroalkyl group was also recognized in other dichroic dyes. Although it is not shown in figure, (T3E1) exhibited a particularly small full width at half maximum in absorption spectrum, thus indicating a possibility of more clear color display.

Example 2

The following various anthraquinone dyes were synthesized in addition to the dyes synthesized in Example 1.

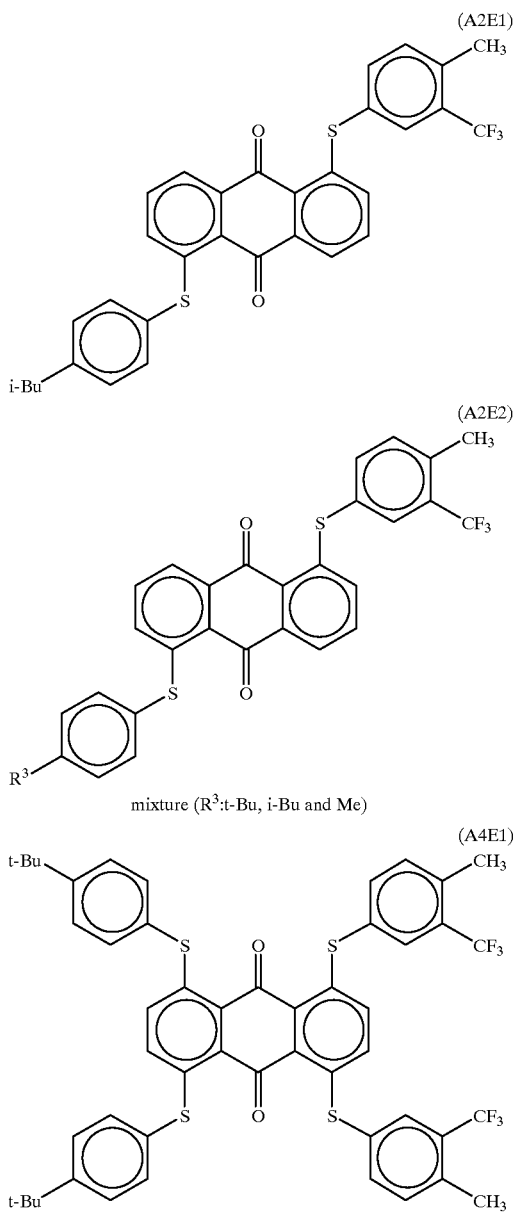

(A4E2)
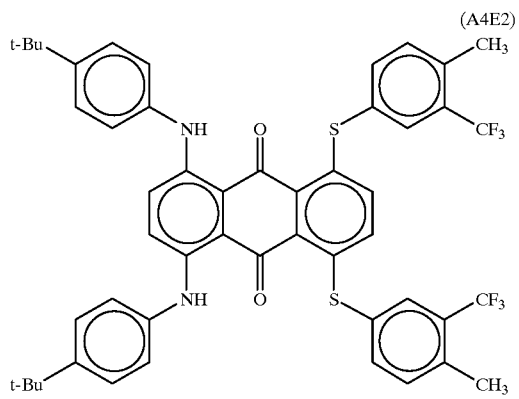
(A2E3)
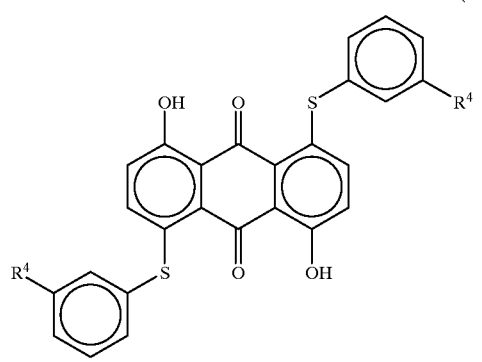
mixture (R⁴:CF₃ and C₂F₅)
(A2E4)
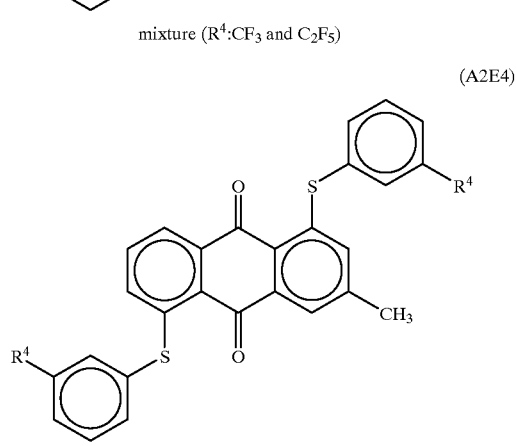
mixture (R⁴:CF₃ and C₂F₅)
(A4E3)
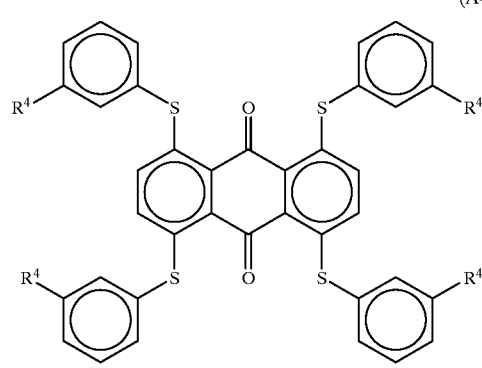
mixture (R⁴:CF₃ and C₂F₅)
(A2E5)
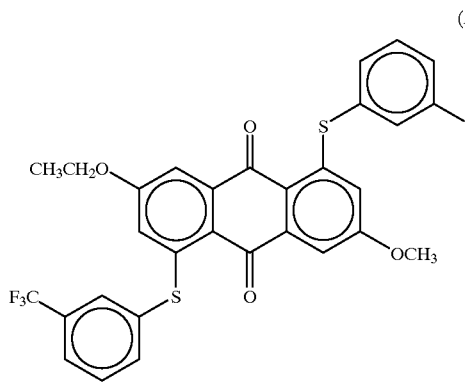
(A2E6)
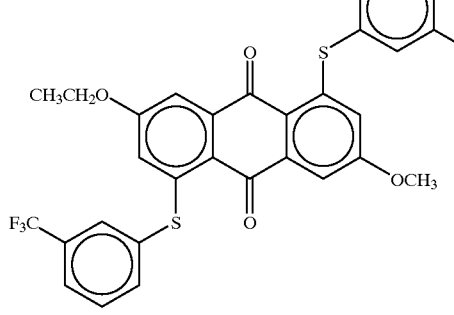
(A1E1)
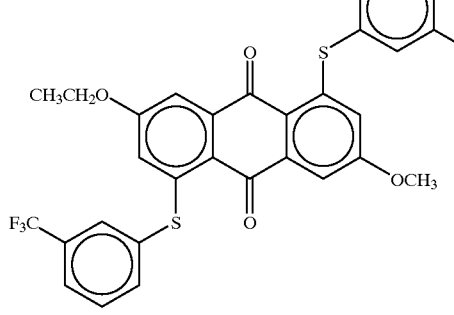
(A2E7)
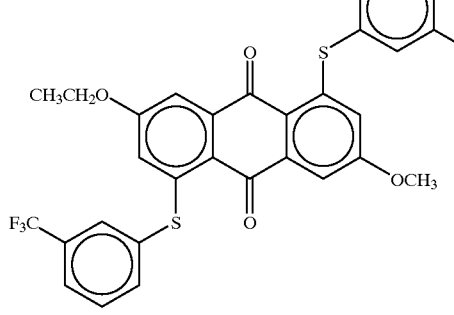

Figure 2:
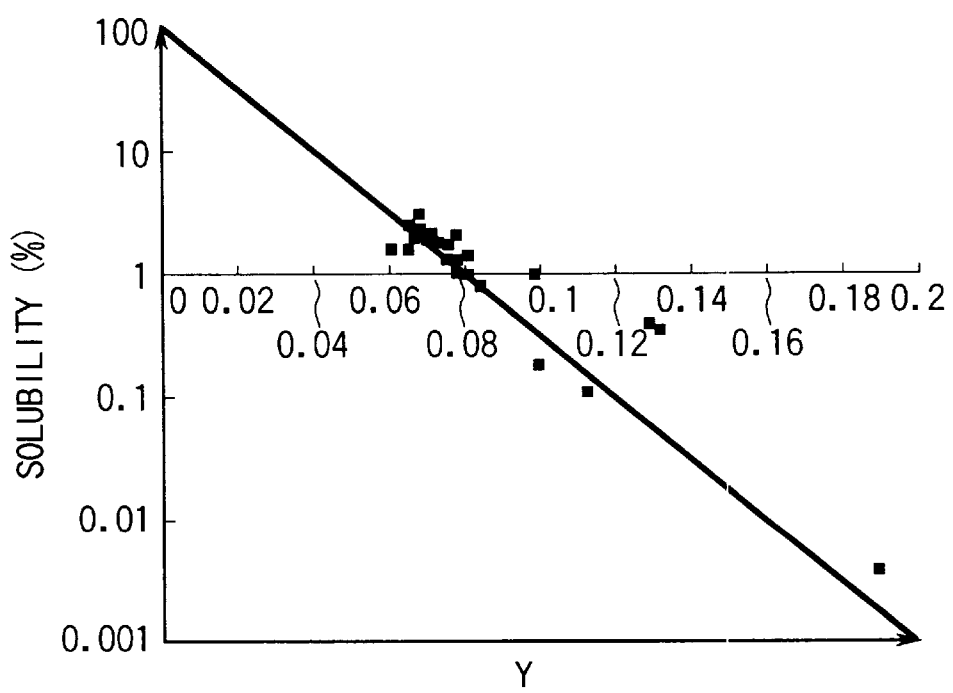
FIG. 2 is a graph showing a relationship between the Y value and the solubility at $-5°$ C. of anthraquinone dyes.

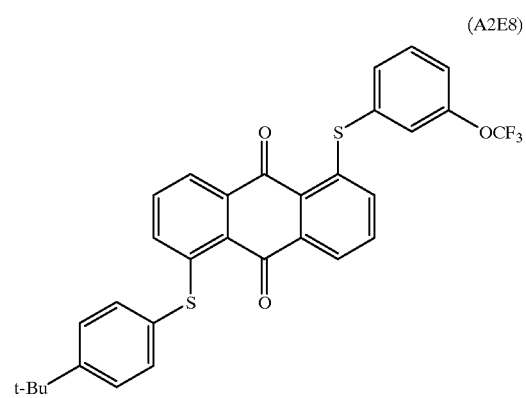
(A2E8)
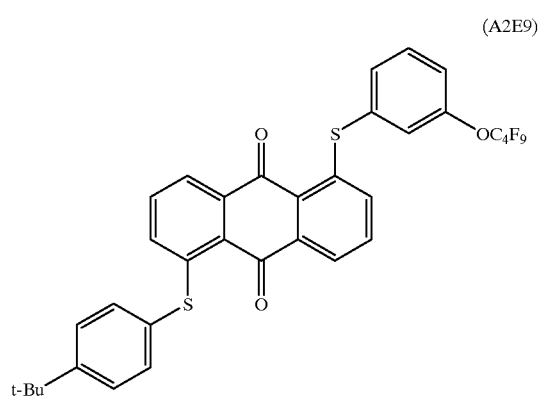
(A2E9)
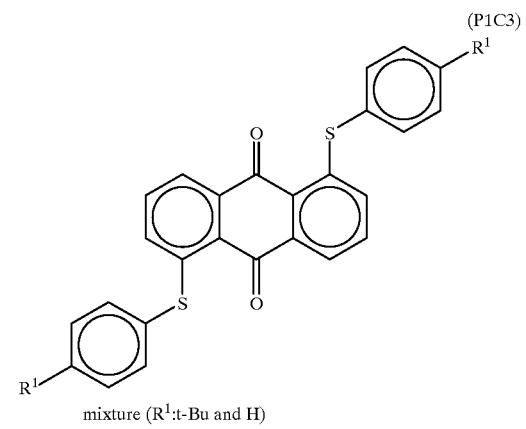
(P1C3)
mixture (R¹:t-Bu and H)
mixture (R¹:t-Bu, i-Bu, Me and H) (P1C4)
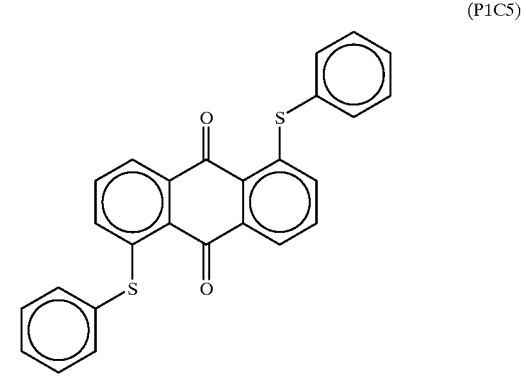
(P1C5)
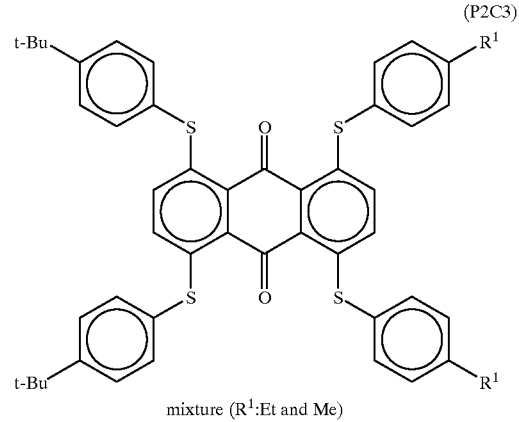
(P2C3)
mixture (R¹:Et and Me)
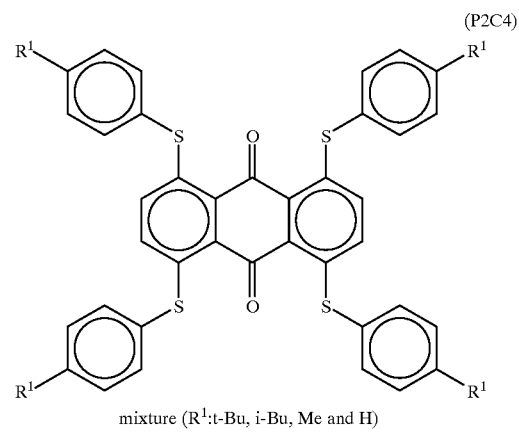
(P2C4)
mixture (R¹:t-Bu, i-Bu, Me and H)
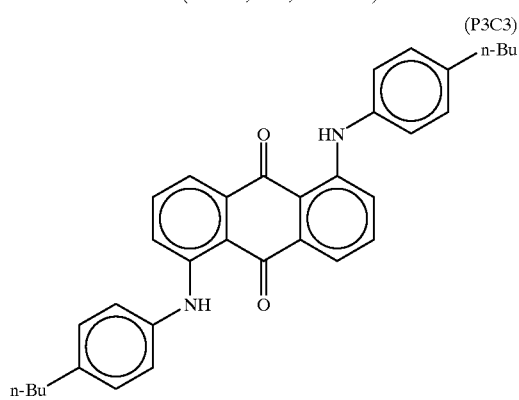
(P3C3)
(P4C3)
Next, the measurement of thermodynamic parameter was performed on the anthraquinone dyes shown in Table 4 thereby to determine the Y value. Further, the solubility of each anthraquinone dye in a fluorinated liquid crystal (LIXON5052xx) at −5° C. was measured, the results being shown in Table 4. FIG. 2 shows a relationship between the Y value and the solubility. The (P2E2) shown in Table 4 was similar in molecular structure to that of (P2E1), but it was a mixture of a molecule having a t-butyl group as a terminal alkyl group and a molecule having a methyl group as a terminal the alkyl group. Likewise, the (P4E2) shown in Table 4 was similar in molecular structure to that of (P4E1), but it was a mixture of a molecule having a t-butyl group as a terminal the alkyl group and a molecule having a methyl group as a terminal alkyl group.

TABLE 4

| Dichroic dye | Y | Solubility (wt %) |
| --- | --- | --- |
| P1E1 | 0.060 | 3.5 |
| P2E2 | 0.077 | 2.1 |
| P4E2 | 0.067 | 3.1 |
| T1E1 | 0.08 | 1.00 |
| T1E2 | 0.075 | 1.75 |
| T2E1 | 0.078 | 1.05 |
| T3E1 | 0.075 | 1.35 |
| T4E1 | 0.070 | 2.10 |
| T5E1 | 0.072 | 1.85 |
| A2E1 | 0.08 | 1.4 |
| A2E2 | 0.068 | 3.1 |
| A4E1 | 0.06 | 1.6 |
| A4E2 | 0.065 | 1.6 |
| A2E3 | 0.071 | 2.20 |
| A2E4 | 0.065 | 2.55 |
| A4E3 | 0.066 | 2.00 |
| A2E5 | 0.067 | 2.30 |
| A2E6 | 0.078 | 1.2 |
| A1E1 | 0.08 | 1.1 |
| A2E7 | 0.079 | 1.2 |
| A2E8 | 0.076 | 1.4 |
| A2E9 | 0.078 | 1.3 |
| P1C3 | 0.129 | 0.4 |
| P1C4 | 0.19 | 0.004 |
| P1C5 | 0.099 | 0.99 |
| P2C3 | 0.1 | 0.18 |
| P2C4 | 0.132 | 0.36 |
| P3C3 | 0.113 | 0.109 |
| P4C3 | 0.084 | 0.8 |

As seen from FIG. 2, in order to realize 1% by weight or more in solubility of anthraquinone dye to a liquid crystal at −5° C., the Y value should be 0.08 or less. The anthraquinone dye exhibiting the Y value of 0.07 or less indicated a solubility of 2% by weight or more, and hence the dye is more advantageous in reducing the driving voltage by reducing the thickness of the liquid crystal layer.

Example 3

Figure 3:
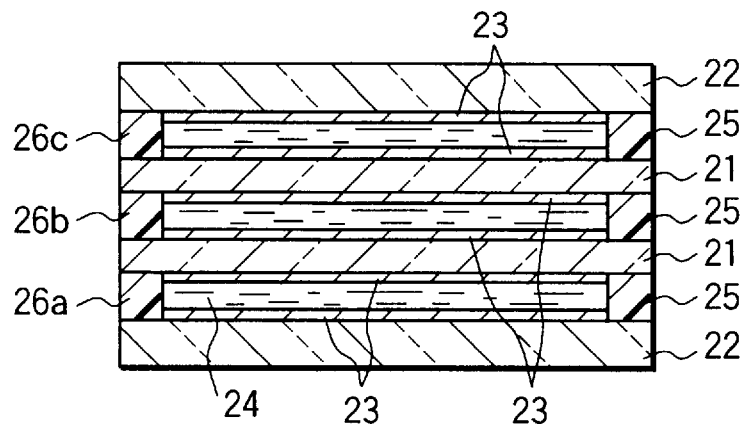
FIG. 3 is a cross-sectional view of the reflective GH-LCD having a three-layered structure according to Example 3.

A reflective GH-LCD having a three-layered structure driven by TFT as shown in FIG. 3 was manufactured. The LCD had a size of 4 inches cross corners and a number of pixels of 320×240.

First, a pattern of ITO electrode 23 was formed on both surfaces of each of two glass substrates 21 having a thickness of 0.5 mm. Then, an ITO electrode 23 was formed on a surface of one of glass substrates 22 having a thickness of 1 mm. An aluminum reflective electrode 24 was formed on a surface of the other one of glass substrates 22 having a thickness of 1 mm. After a polyimide film was coated on each electrode, the film was subjected to a rubbing treatment.

By making use of these substrates, a cell was assembled as shown in FIG. 3. Specifically, glass spacers (not shown) having a particle size of 9 μm were sprayed on the substrate 22 bearing the aluminum reflective electrode 24, and an epoxy sealant 25 was formed on the marginal portion of the substrate 22. Thereafter, the glass substrate 21 provided on both surfaces with the ITO electrodes 23 was placed on the substrate 22. Likewise, the other glass substrate 21 provided on both surfaces with the ITO electrodes 23 was placed on the aforementioned glass substrate 21. Furthermore, the substrates 22 provided with the ITO electrode 23 was placed on the glass substrate 21. Then, a colored liquid crystal was sealed in the liquid crystal cell of each layer, whereby forming liquid crystal layers 26a, 26b and 26c. In this example, a yellow liquid crystal, a cyan liquid crystal and a magenta liquid crystal were sealed in this order beginning from the lowest liquid crystal cell. Note that, there is not any particular restriction regarding the order of these colored liquid crystals sealed in the liquid crystal layers 26a, 26b and 26c.

Figure 4:
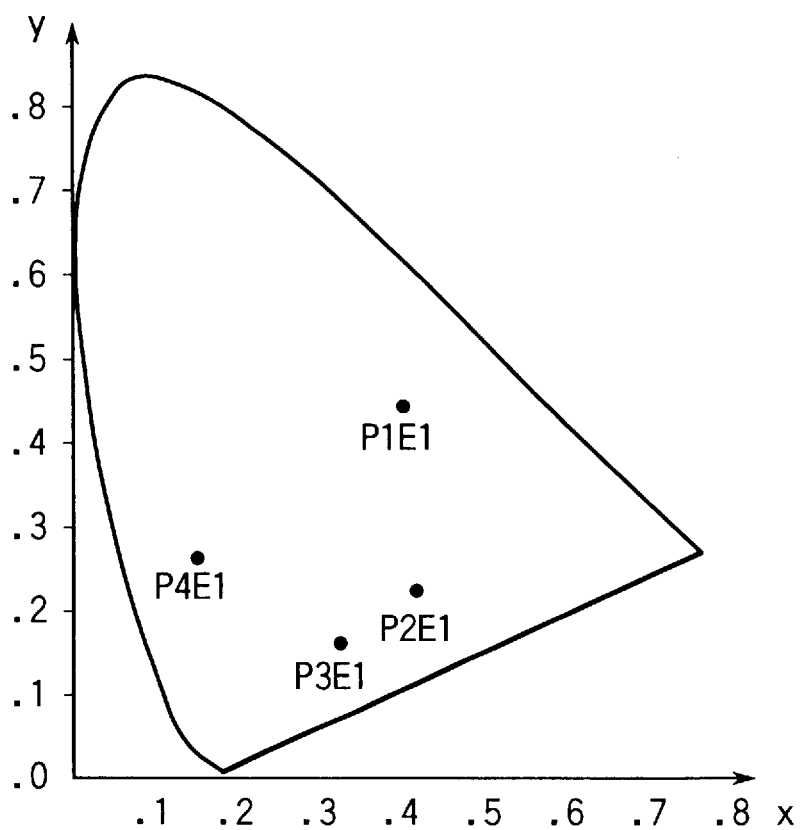
FIG. 4 is a chromaticity diagram showing the hue of the reflected light as obtained from GH-LCDs employing a dichroic dye according to this invention.

The hue of the reflected light obtained by a single liquid crystal cell containing any one of (P1E1) as a yellow dye, (P4E1) as a cyan dye, and (P2E1) or (P3E1) as a magenta dye is shown in the chromaticity diagram in FIG. 4.

It is surmised that a GH-LCD having a structure shown in FIG. 3 will exhibit display characteristic as follows. In the case of the GH-LCD using the dichroic dyes of (P1E1), (P4E1) and (P2E1), the reflected light by the liquid crystal cell using the magenta dye (P2E1) is close to red, so that it will be possible to obtain advantageously a clear reddish display. By contrast, in the case of the GH-LCD using the dichroic dyes of (P1E1), (P4E1) and (P3E1), the reflected light by the liquid crystal cell using the magenta dye (P3E1) is close to blue, so that it will be possible to obtain advantageously a clear bluish display. Therefore, it is possible to obtain a GH-LCD which exhibits any desired color by using (P2E1) and (P3E1) as a magenta dye and by adjusting the mixing ratio of these dyes.

Example 4

A microcapsule containing a liquid crystal and a dichroic dye was prepared as follows, and a display device was manufactured using the microcapsule.

First, 1.3 wt % of a yellow dichroic dye (P1E1) was dissolved in a fluorinated nematic liquid crystal (LIXSON5052xx, Chisso Kagaku Kogyo Co., Ltd.) to obtain a liquid crystal composition. Eighty parts by weight of this liquid crystal composition, seven parts by weight of hydrophilic methylmethacrylate monomer, seven parts by weight of hydrophobic isobutylmethacrylate monomer, and, as a cross linking agent, one part by weight of ethylene glycol dimethacrylate and 0.2 parts by weight of benzoyl peroxide were mixed together. Then, the resultant mixture was emulsified together with three parts by weight of polyvinyl alcohol and 300 parts by weight of pure water. Thereafter, the monomers contained in the emulsion was allowed to polymerize with stirring at 85° C. for one hour. Then, the reaction mixture was filtered through a 1 μm filter, and washed three times with pure water thereby to obtain a microcapsule in which the liquid crystal composition was encapsulated by a transparent polymer film.

The microcapsule was dispersed in 10% aqueous solution of isopropyl alcohol at a ratio of 10 wt %, and the resultant dispersed solution was coated on a glass substrate provided with an aluminum reflective electrode and dried to form a liquid crystal layer. Then, a glass substrate provided with a transparent electrode was placed on the liquid crystal layer. The resultant structure was placed in a polyamide bag and the interior of the bag was evacuated and heated to 12° C. thereby to adhere these substrates with each other. As a result, a display device provided with a liquid crystal layer having a thickness of 10 μm was obtained.

This display device exhibited yellow, color. With the application of AC voltage of 50 Hz and 12V, the display device was turned transparent. The contrast measured based on the reflection density was 3.4, indicating a sufficient tone.

Example 5

A GH-LCD of three-layered structure shown in FIG. 3 was manufactured as follows. First, an STN liquid crystal mixture (LIXON4031, Chisso Kagaku Kogyo Co., Ltd.) containing a chiral agent (S811, E. Merk Co., Ltd.) was prepared. Then, 2.5% of a yellow anthraquinone dye (P1E2) was dissolved in the liquid crystal mixture to obtain a liquid crystal composition. Similarly, 2.0% of a magenta anthraquinone dye (P2E2) was dissolved in the liquid crystal mixture to obtain a liquid crystal composition. Further, 1.5% of a cyan anthraquinone dye (P3E2) was dissolved in the liquid crystal mixture to obtain a liquid crystal composition. Then, a magenta liquid crystal composition, a yellow liquid crystal composition and a cyan liquid crystal composition were sealed in this order beginning from the lowest cell of the three-layered liquid crystal cells shown in FIG. 3, thus obtaining the GH-LCD.

When the GH-LCD was operated with a voltage of 2V and a voltage width of 0.2V, the contrast ratio between white and black was found to be 3.4, indicating a sufficient tone. Further, when the liquid crystal display device was left to stand for 3 days at −5° C., any deterioration in display performance was not recognized.

For the purpose of comparison, another GH-LCD was manufactured in the same manner as described above except that (P1C3) was substituted as a yellow dye for (P1E2), (P2C3) was substituted as a magenta dye for (P2E2), and (P4C3) was substituted as a cyan dye for (P3E2).

When the GH-LCD was operated with a voltage of 2V and a voltage width of 0.2V, the contrast ratio between white and black was found to be 3.3, indicating a sufficient tone. However, when the GH-LCD was left to stand for 3 days at −5° C., a precipitation of dye was recognized at each liquid crystal layer, thus greatly deteriorating the display performance.

Example 6

Figure 5A:
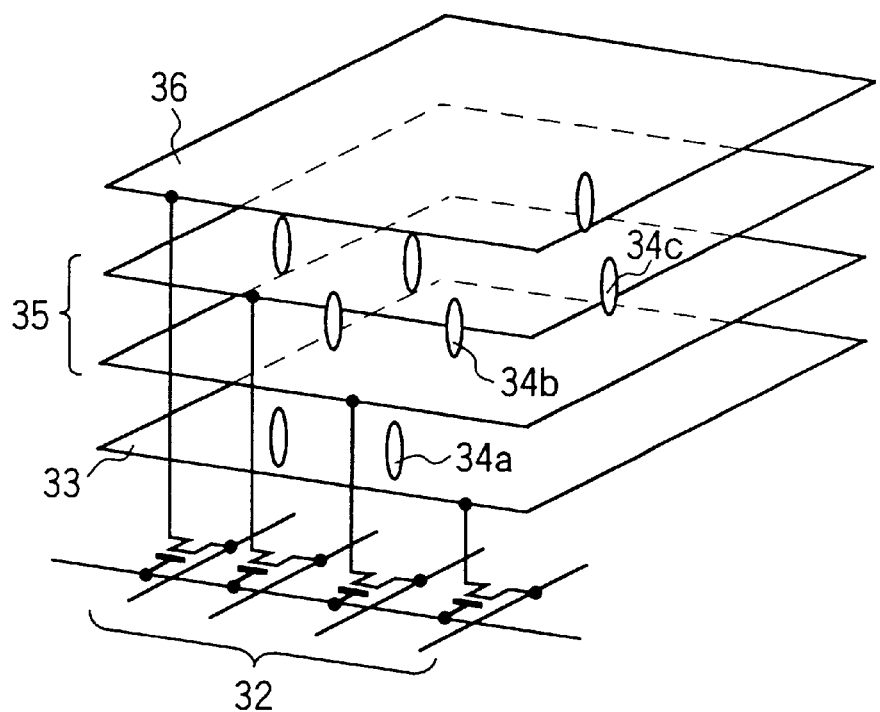
FIG. 5A is a perspective view schematically showing the reflective GH-LCD having a three-layered structure according to Example 6.
Figure 5B:
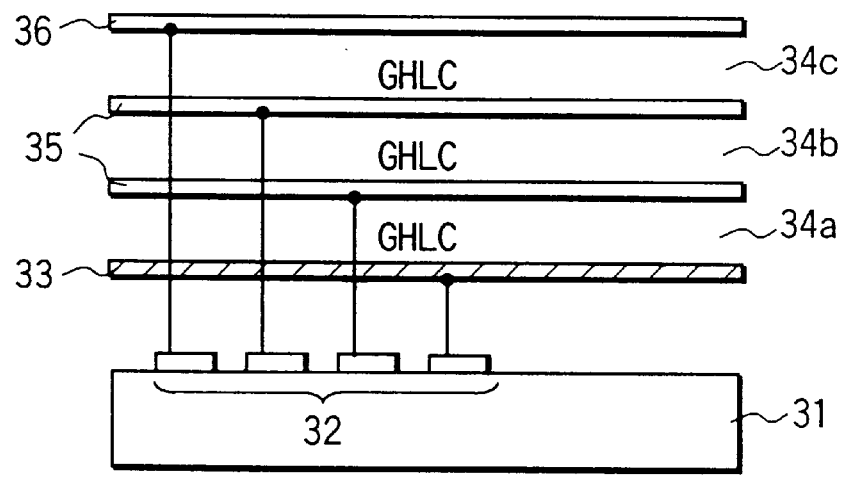
FIG. 5B is a cross-sectional view schematically showing the reflective GH-LCD having a three-layered structure according to Example 6.

A GH-LCD of three-layered structure shown in FIGS. 5A and 5B was manufactured by making use of a microcapsule containing a liquid crystal and a dichroic dye.

FIG. 5A shows a schematic view of the GH-LCD of this example, while FIG. 5B shows a cross-sectional view of FIG. 5A. A plurality of TFTs 32 are formed on a substrate 31. A reflector 33 made of aluminum, for instance, is formed on the substrate 31 with interposing an insulating film. The reflector 33 constitutes a pixel electrode. A yellow liquid crystal layer 34a, a transparent electrode layer (a pixel electrode) 35, a magenta liquid crystal layer 34b, a transparent electrode layer (a pixel electrode) 35, and a cyan liquid crystal layer 34c are stacked on the reflector 33. The transparent electrode layer 35 can be formed by a method of sputtering a transparent electrode material, followed by patterning by photolithography, or by a printing method with a liquid containing a transparent electrode material dispersed therein. On the upper surface of the cyan liquid crystal layer 34c, disposed is a glass substrate or a polymer film provided with a transparent counter electrode 36. Each of the TFTs 32 is electrically connected with the reflector 33 and the transparent electrode 35.

The aforementioned liquid crystal layers 34a to 34c are formed of microcapsule which is prepared in the same manner as explained in Example 4, employing guest-host liquid crystal compositions, each comprising a fluorinated liquid crystal (LIXON5052xx) and 2.4%, 2.0% or 1.5% of the anthraquinone dye (P1E2), (P2E2) or (P3E2) which is dissolved in the liquid crystal, respectively.

When a color display is performed using the GH-LCD, the voltage to be applied to four electrodes sandwiching each liquid crystal layer is determined in advance, and the preset value is stored in an arithmetric circuit. FIGS. 6A to 6H show voltages to be applied to each electrode. The symbol G denotes a ground potential, and the symbol V denotes a potential which enables to obtain a high transmittance close to the saturation transmittance. The reason for indicating the voltage in two ways is to give an AC waveform to the liquid layer.

Figure 6A:
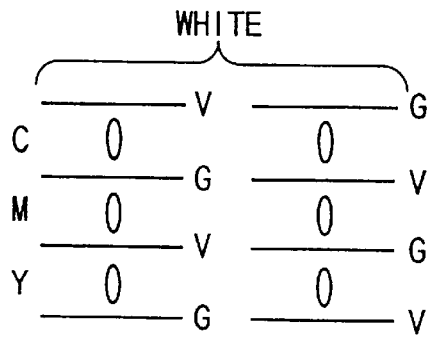
FIGS. 6A to 6H are diagrams respectively showing a relationship between voltages applied to each electrode of the reflective GH-LCD having a three-layered structure according to Example 6 and the display colors to be obtained.
Figure 6E:
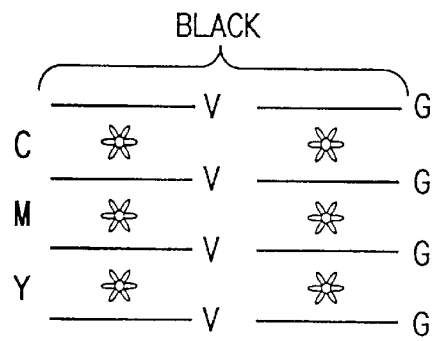
Figure 6B:
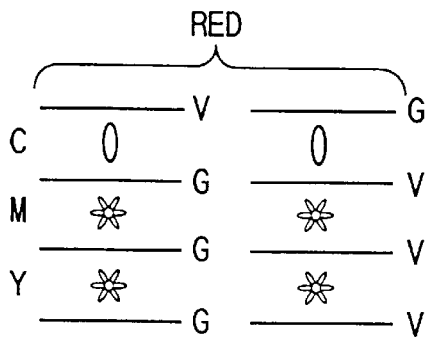
Figure 6F:
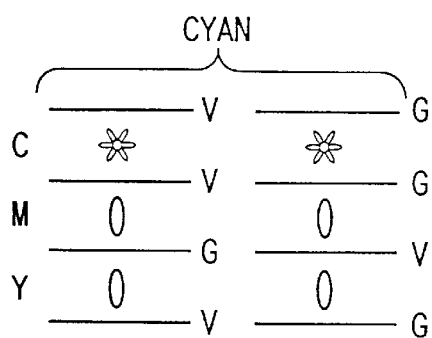
Figure 6C:
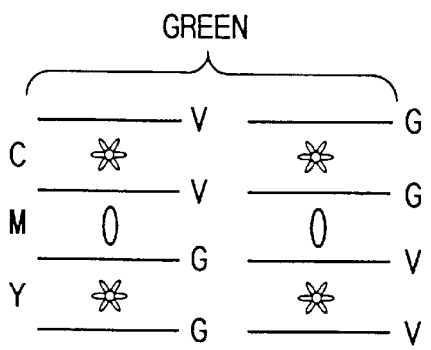
Figure 6G:
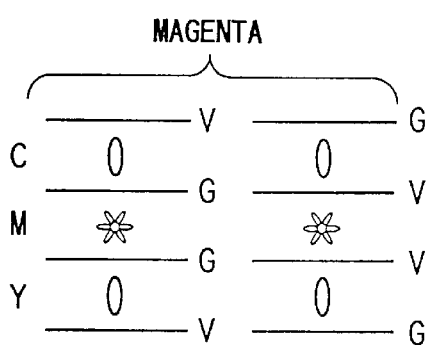
Figure 6D:
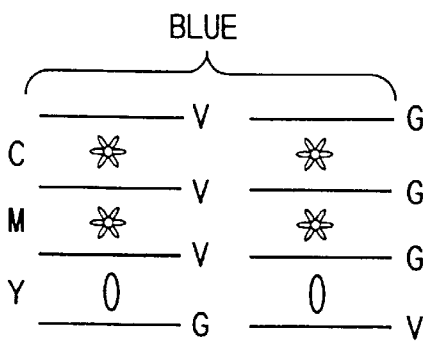
Figure 6H:
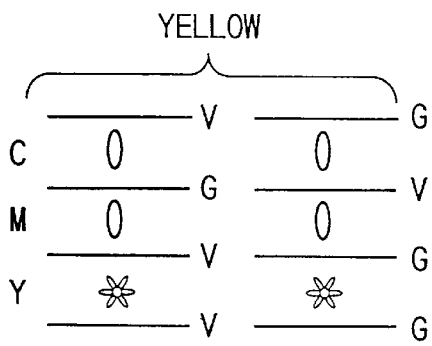

For example, if "white" is to be displayed, a voltage is applied as shown in FIG. 6A. When a voltage is applied in this manner, the liquid crystal molecules and dye molecules are orientated in perpendicular to the surface of electrode, thereby allowing light to pass through. Likewise, in the case of displaying other colors, the voltage between the liquid crystal layers is controlled as shown in FIGS. 6B to 6H.

When this liquid crystal display device was operated with a voltage of 5V, the contrast ratio between white and black was found to be 3.2, indicating a sufficient tone. Further, when the liquid crystal display device was left to stand for 3 days at −5° C., any deterioration in display performance was not recognized.

Example 7

A red mixed dye was prepared by mixing a yellow dye (P1E1) and a magenta dye (P2E1) at a mixing ratio of 2:3. A green mixed dye was prepared by mixing a yellow dye (P1E1) and a cyan dye (P4E1) at a mixing ratio of 1:1. A blue mixed dye was prepared by mixing a magenta dye (P2E1) and a cyan dye (P4E1) at a mixing ratio of 1:1. Then, three kinds of liquid crystal microcapsule were prepared using these mixed dyes in the same manner as explained in Example 4. The particle size of these microcapsules were conditioned in such a way that when each microcapsule was employed to form a liquid crystal layer, the threshold voltage was set to 6V.

On the other hand, there kinds of liquid crystal microcapsule were prepared using the yellow dye (P1E1), the magneta dye (P2E1) and the cyan dye (P4E1), respectively, in the same manner as explained in Example 4. The particle size of these microcapsules were conditioned in such a way that when each microcapsule was employed to form a liquid crystal layer, the threshold voltage was set to 4V.

Figure 7:
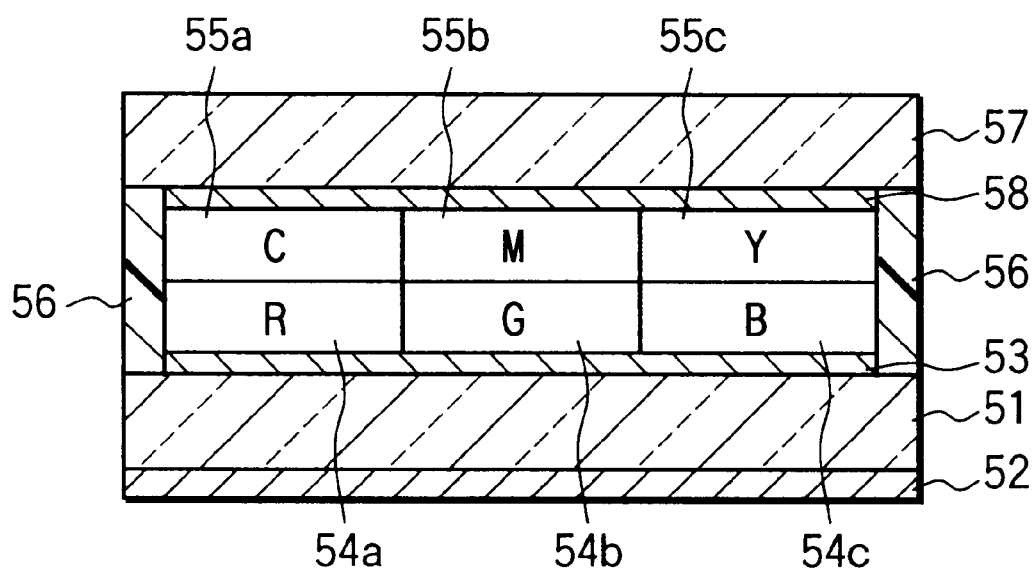
FIG. 7 is a cross-sectional view of the reflective GH-LCD according to Example 7.

A LCD as shown in FIG. 7 was manufactured by using these microcapsules. Namely, an aluminum reflector 52 was formed on the rear surface of a glass substrate 51, and an ITO electrode 53 was formed on the upper surface of the glass substrate 51. Three kinds of liquid crystal layers 54a, 54b and 54c each representing red color (R), green color (G) and blue color (B) respectively were formed in a stripe pattern on the ITO electrode 53 by means of printing. Likewise, a cyan liquid crystal layer 55a, a magenta liquid crystal layer 55b and a yellow liquid crystal layer 55c were formed in a stripe pattern on the red liquid crystal layer 54a, the green liquid crystal layer 54b and the blue liquid crystal layer 54c, respectively. The colors of stacked two liquid crystals layers were complementary to each other.

A sealant 56 was formed on the marginal portion of the glass substrate 51, on which a glass substrate 57 bearing an ITO electrode 58 was placed.

According to this LCD, it is possible, by adjusting the applying voltage, to display white, red and black colors with only one pixel comprising a stack of a red liquid crystal layer 54a and a cyan liquid crystal layer 55a, for instance. Likewise, with regard to other pixels, it is possible, by adjusting the applying voltage, to display white, green and black colors, or to display white, blue and black colors.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:
1. A liquid crystal display device comprising:

a pair of substrates having an electrode on a surface thereof; and a liquid crystal layer containing a liquid crystal and a dichroic dye, wherein said dichroic dye is represented by any one of the following formulas (P1) to (P8);

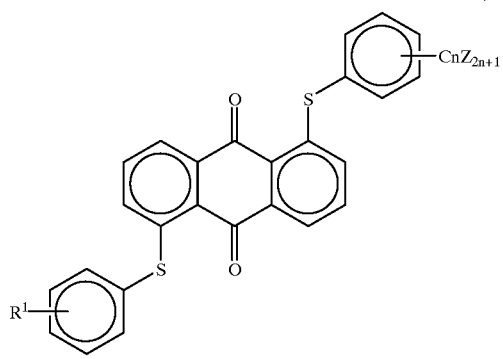
(P1)

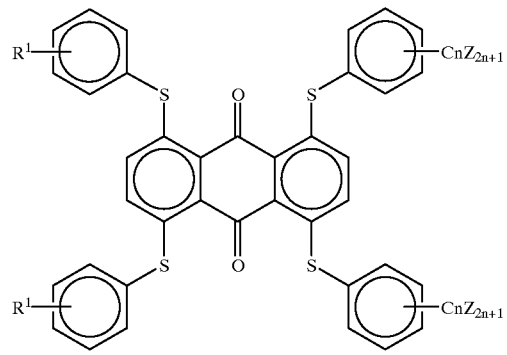
(P2)

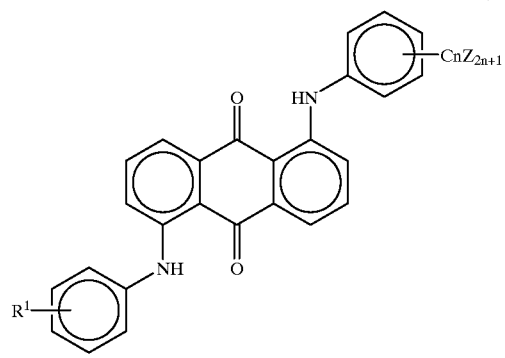
(P3)

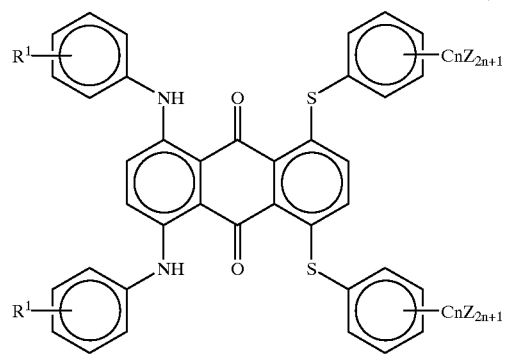
(P4)

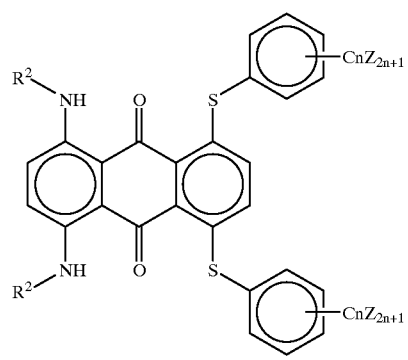
(P5)

-continued

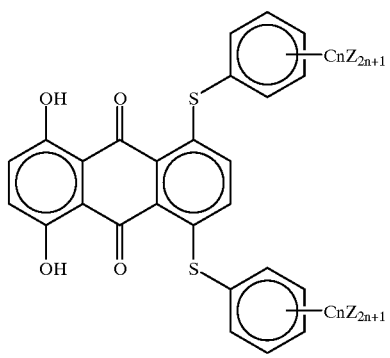 (P6)

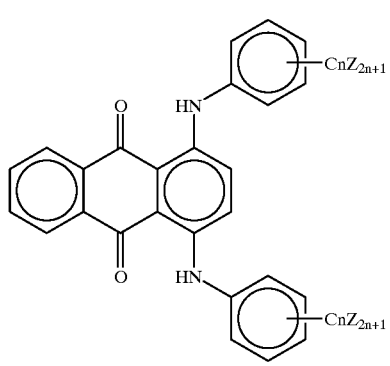 (P7)

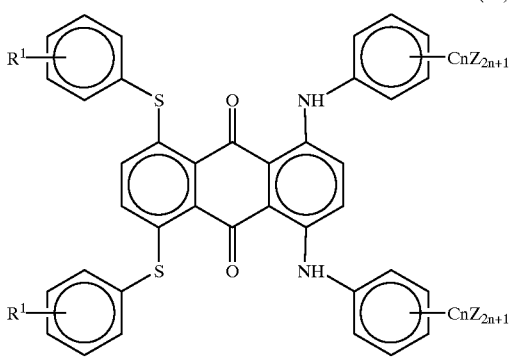 (P8)

wherein $R^1$ is selected from the group consisting of a hydrogen atom, an alkyl group having not more than 12 carbon atoms, and an aryl group substituted by an alkyl group having not more than 12 carbon atoms; $R^2$ is selected from the group consisting of an alkyl group having not more than 12 carbon atoms, and an aryl group substituted by an alkyl group having not more than 12 carbon atoms; Z is a halogen atom; and n is an integer of 1 to 12.

2. The liquid crystal display device according to claim 1, wherein said $R^1$ or $R^2$ is an alkyl group having 1 to 4 carbon atoms.

3. The liquid crystal display device according to claim 1, wherein said $C_nZ_{2n+1}$ is $C_nF_{2n+1}$ and is introduced to the meta position.

4. The liquid crystal display device according to claim 1, wherein said liquid crystal comprises a fluorinated liquid crystal.

5. The liquid crystal display device according to claim 1, wherein said dichroic dye is a mixture of two or more kinds of dichroic dyes differing in color from each other.

6. The liquid crystal display device according to claim 1, wherein said liquid crystal and dichroic dye are encapsulated in a microcapsule.

7. The liquid crystal display device according to claim 1, wherein a yellow liquid crystal layer, a magenta liquid crystal layer and a cyan liquid crystal layer are sandwiched between a pair of substrates with interposing electrode layers between the liquid crystal layers, and said liquid crystal layers are designed to be individually applied with a voltage.

8. The liquid crystal display device according to claim 1, wherein a liquid crystal layer comprising a microcapsule exhibiting a first color, and another liquid crystal layer comprising a microcapsule exhibiting a second color which is complementary to said first color are stacked between a pair of substrates.

9. The liquid crystal display device according to claim 1, wherein a reflector is formed on an outer surface of one of said substrates.

10. The liquid crystal display device according to claim 1, wherein a reflector is interposed between one of said substrates and the liquid crystal layer.

11. A liquid crystal display device comprising:

a pair of substrates having an electrode on a surface thereof; and a liquid crystal layer containing a liquid crystal and a dichroic dye, wherein said dichroic dye is represented by any one of the following formulas (T1) to (T5):

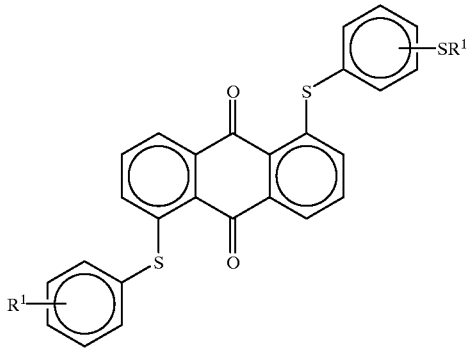 (T1)

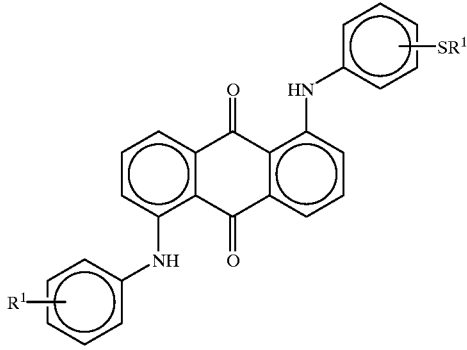 (T2)

-continued

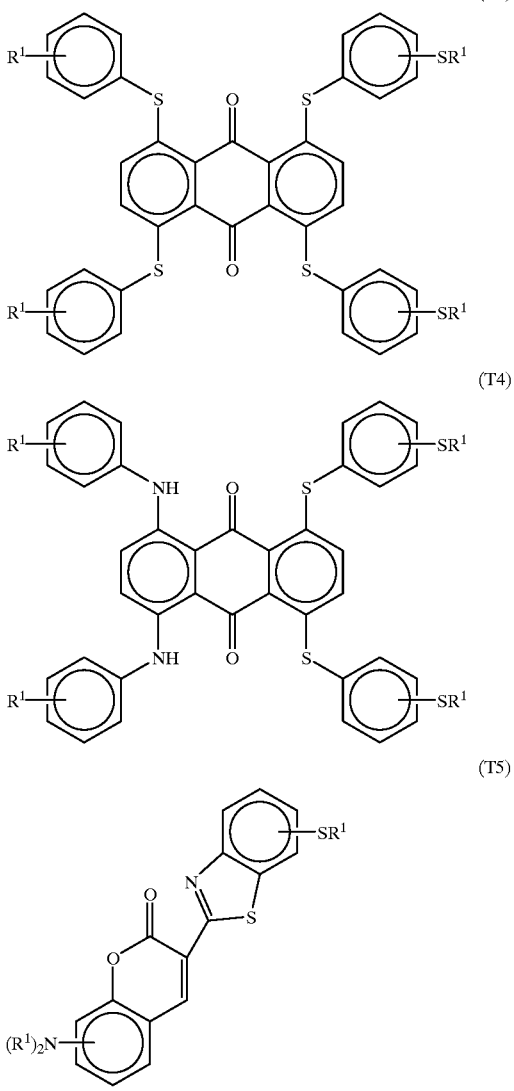

wherein R¹ is selected from the group consisting of a hydrogen atom, an alkyl group having not more than 12 carbon atoms, and an aryl group substituted by an alkyl group having not more than 12 carbon atoms.

12. The liquid crystal display device according to claim 11, wherein said R¹ is an alkyl group having 1 to 4 carbon atoms.

13. The liquid crystal display device according to claim 11, wherein said liquid crystal comprises a fluorinated liquid crystal.

14. The liquid crystal display device according to claim 11, wherein said dichroic dye is a mixture of two or more kinds of dichroic dyes differing in color from each other.

15. The liquid crystal display device according to claim 11, wherein said liquid crystal and dichroic dye are encapsulated in a microcapsule.

16. The liquid crystal display device according to claim 11, wherein a yellow liquid crystal layer, a magenta liquid crystal layer and a cyan liquid crystal layer are sandwiched between a pair of substrates with interposing electrode layers between the liquid crystal layers, and said liquid crystal layers are designed to be individually applied with a voltage.

17. The liquid crystal display device according to claim 11, wherein a liquid crystal layer comprising a microcapsule exhibiting a first color, and another liquid crystal layer comprising a microcapsule exhibiting a second color which is complementary to said first color are stacked between a pair of substrates.

18. The liquid crystal display device according to claim 11, wherein a reflector is formed on an outer surface of one of said substrates.

19. The liquid crystal display device according to claim 11, wherein a reflector is interposed between one of said substrates and the liquid crystal layer.

20. A liquid crystal display device comprising:
a pair of substrates having an electrode on a surface thereof; and
a liquid crystal layer containing a liquid crystal and a dichroic dye,
wherein said dichroic dye is an anthraquinone dye exhibiting 0.08 or less of the Y value represented by the following equation;

$$Y=\{\Sigma\Delta H\ tr,m/268-\Sigma\Delta S\ tr,m\}(kJK^{-1}kg^{-1})$$

wherein $\Sigma\Delta H$ tr,m is a sum of an enthalpy change of transition from −5° C. to the melting point and an enthalpy change of melting per unit weight; and $\Sigma\Delta S$ tr,m is a sum of an entropy change of transition from −5° C. to the melting point and an entropy change of melting per unit weight.

21. The liquid crystal display device according to claim 20, wherein said anthraquinone dye is provided on its asymmetrical positions with polar groups selected from the group consisting of a cyano group, a perfluoroalkyl group, a perfuluoroalkoxyl group, a halogen atom, an ester group, a carbonyl group, an alkoxyl group, a thioalkyoxyl group, a nitro group and a hydroxyl group.

22. The liquid crystal display device according to claim 20, wherein said Y is 0.07 or less.

23. The liquid crystal display device according to claim 20, wherein said anthraquinone dye is represented by the following formula (A1)

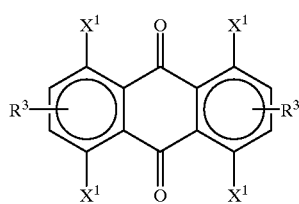

wherein X¹ is selected from the group consisting of H, OH, SR and NHR (R is selected from the group consisting of H, an alkyl group and an aryl group) with a proviso that at least two of X¹ groups are OH, SR or NHR; R³ is selected from the group consisting of a hydrogen atom, an alkyl group, an aryl group, an alkoxyl group and a thioalkcoxyl group; the alkyl group may be substituted by a halogen atom; and the aryl group may be a heterocyclic group.

24. The liquid crystal display device according to claim 20, wherein said anthraquinone dye is represented by any one of the following formulas (A2) to (A4):

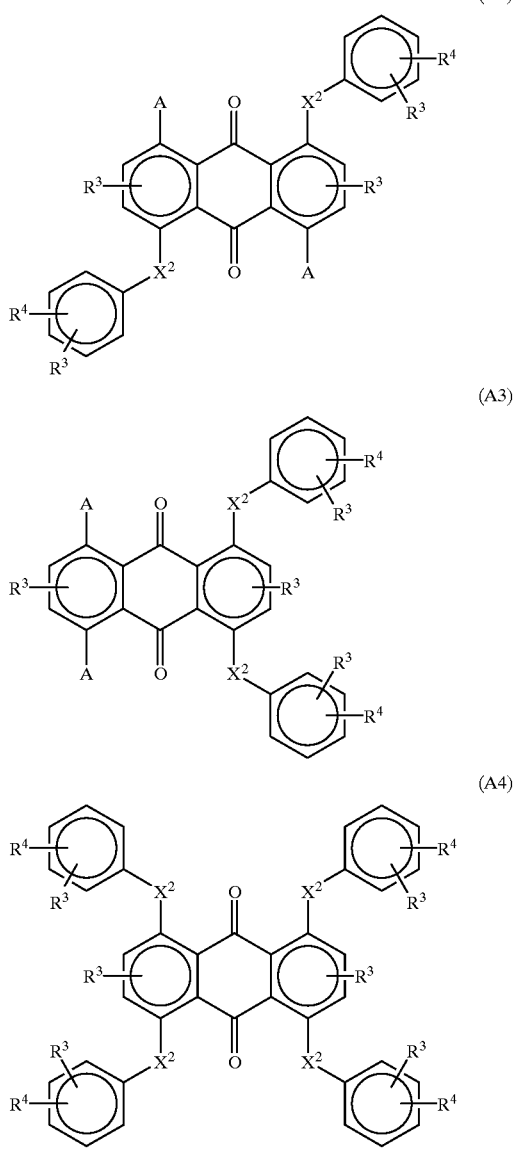

wherein $X^2$ is selected from the group consisting of S or NH; A is selected from the group consisting of H, OH or NHR (R is selected from the group consisting of H, an alkyl group and an aryl group); $R^3$ is selected from the group consisting of a hydrogen atom, an alkyl group, an aryl group, an alkoxyl group and a thio-alkoxyl group; and $R^4$ is selected from the group consisting of a hydrogen atom, a perfluoroalkyl group, a cyano group and a nitro group.

25. The liquid crystal display device according to claim 20, wherein said liquid crystal comprises a fluorinated liquid crystal.

26. The liquid crystal display device according to claim 20, wherein said dichroic dye is a mixture of two or more kinds of dichroic dyes differing in color from each other.

27. The liquid crystal display device according to claim 20, wherein said liquid crystal and dichroic dye are encapsulated in a microcapsule.

28. The liquid crystal display device according to claim 20, wherein a yellow liquid crystal layer, a magenta liquid crystal layer and a cyan liquid crystal layer are sandwiched between a pair of substrates with interposing electrode layers between the liquid crystal layers, and said liquid crystal layers are designed to be individually applied with a voltage.

29. The liquid crystal display device according to claim 20, wherein a liquid crystal layer comprising a microcapsule exhibiting a first color, and another liquid crystal layer comprising a microcapsule exhibiting a second color which is complementary to said first color are stacked between a pair of substrates.

30. The liquid crystal display device according to claim 20, wherein a reflector is formed on an outer surface of one of said substrates.

31. The liquid crystal display device according to claim 20, wherein a reflector is interposed between one of said substrates and the liquid crystal layer.

* * * * *

UNITED STATES PATENT AND TRADEMARK OFFICE
CERTIFICATE OF CORRECTION

PATENT NO. : 6,033,742
DATED : March 7, 2000
INVENTOR(S) : Hiroki IWANAGA, et al It is certified that error appears in the above-indentified patent and that said Letters Patent is hereby corrected as shown below:

Title Page, Item [57], in the Abstract, line 9, after "point", delete "of".

Claim 21, Column 48, line 36, "perfuluoroalkoxyl" should read --perfluoroalkoxyl--.

Claim 23, Column 48, line 62, "thioalkcoxyl" should read --thioalkoxyl--.

Signed and Sealed this

Twenty-seventh Day of March, 2001

Attest:

NICHOLAS P. GODICI

*Attesting Officer*    *Acting Director of the United States Patent and Trademark Office*